(12) United States Patent
Morimoto et al.

(10) Patent No.: US 8,406,570 B2
(45) Date of Patent: Mar. 26, 2013

(54) IMAGE PROCESSING APPARATUS, IMAGE FORMING APPARATUS, IMAGE READING APPARATUS, IMAGE PROCESSING METHOD, AND RECORDING MEDIUM

(75) Inventors: Atsuhisa Morimoto, Osaka (JP); Yohsuke Konishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 729 days.

(21) Appl. No.: 12/607,443

(22) Filed: Oct. 28, 2009

(65) Prior Publication Data

US 2010/0103481 A1    Apr. 29, 2010

(30) Foreign Application Priority Data

Oct. 29, 2008   (JP) ................................. 2008-278226

(51) Int. Cl.
*G06K 9/32*   (2006.01)
(52) U.S. Cl. ........ 382/296; 382/112; 382/289; 382/297; 358/1.5; 358/1.9; 358/3.24; 358/448
(58) Field of Classification Search .......................... None
See application file for complete search history.

(56) References Cited

U.S. PATENT DOCUMENTS

| | | | | |
|---|---|---|---|---|
| 7,671,845 | B2 * | 3/2010 | Keely | 345/169 |
| 2006/0061599 | A1 * | 3/2006 | Yu et al. | 345/649 |
| 2007/0157084 | A1 | 7/2007 | Yano et al. | |
| 2009/0316235 | A1 * | 12/2009 | Morimoto | 358/527 |
| 2011/0199638 | A1 * | 8/2011 | Ogino et al. | 358/1.15 |

FOREIGN PATENT DOCUMENTS

| | | |
|---|---|---|
| JP | 6-189083 A | 7/1994 |
| JP | 2004-56782 A | 2/2004 |
| JP | 2005-269524 A | 9/2005 |
| JP | 2007-200280 A | 8/2007 |

OTHER PUBLICATIONS

"Viewer with which a user can view images by touch operation (iPhone, for example)/S2V", [On Line], Willcom Fansite, Search Date: May 23, 2008, Internet<URL:http://www.willcomfan.com/wzero3/entries/memnOck/000431/>.

* cited by examiner

*Primary Examiner* — Chan S Park
*Assistant Examiner* — Mark Roz
(74) *Attorney, Agent, or Firm* — Birch, Stewart, Kolasch & Birch, LLP

(57) ABSTRACT

The present invention provides an image processing apparatus which processes a scanned image in which a document image is shown, and includes a reliability determining section and a display control section. The reliability determining section determines reliability of coincidences of respective first through fourth directions with a first reference direction, the first through fourth directions being perpendicular to or reverse to each other, the first reference direction being an upward direction of the document image. The display control section creates markers indicating the respective first through fourth directions, and causes a display device to display a preview image in which the markers and the scanned image overlap each other. Further, the display control section causes the markers to be displayed in respective different ways by changing respective densities in accordance with the reliability.

11 Claims, 21 Drawing Sheets

FIG. 5(a)

| ORDER OF RELIABILITY VALUE | DENSITY (COLOR) OF INSTRUCTION REGION |
|---|---|
| RANKED FIRST | (R,G,B) = (R1, 0, 127) |
| RANKED SECOND | (R,G,B) = (R2, 0, 127) |
| RANKED THIRD | (R,G,B) = (R3, 0, 127) |
| RANKED FOURTH | (R,G,B) = (R4, 0, 127) |

FIG. 5(b)

| DENSITY (COLOR) ACCORDING TO ORDER OF RELIABILITY VALUE | |
|---|---|
| R1 | 20 |
| R2 | 75 |
| R3 | 140 |
| R4 | 200 |

FIG. 5(c)

| DENSITY (COLOR) ACCORDING TO RELIABILITY VALUE | |
|---|---|
| R1 | 255 −(LARGEST RELIABILITY VALUE/LARGEST RELIABILITY VALUE)* 255 |
| R2 | 255 −(SECOND LARGEST RELIABILITY VALUE/LARGEST RELIABILITY VALUE)* 255 |
| R3 | 255 −(THIRD LARGEST RELIABILITY VALUE/LARGEST RELIABILITY VALUE)* 255 |
| R4 | 255 −(LOWEST RELIABILITY VALUE/LARGEST RELIABILITY VALUE)* 255 |

FIG. 8 (a)

| ORDER OF RELIABILITY VALUE | SIZE OF INSTRUCTION MARK |
|---|---|
| RANKED FIRST | REFERENCE VALUE OF SIZE * M1 |
| RANKED SECOND | REFERENCE VALUE OF SIZE * M2 |
| RANKED THIRD | REFERENCE VALUE OF SIZE * M3 |
| RANKED FOURTH | REFERENCE VALUE OF SIZE * M4 |

FIG. 8 (b)

| MAGNIFICATION RATIO ACCORDING TO ORDER OF RELIABILITY VALUE | |
|---|---|
| M1 | 4/4 |
| M2 | 3/4 |
| M3 | 2/4 |
| M4 | 1/4 |

FIG. 8 (c)

| MAGNIFICATION RATIO ACCORDING TO ORDER OF RELIABILITY VALUE | |
|---|---|
| M1 | LARGEST RELIABILITY VALUE/LARGEST RELIABILITY VALUE |
| M2 | SECOND LARGEST RELIABILITY VALUE/LARGEST RELIABILITY VALUE |
| M3 | THIRD LARGEST RELIABILITY VALUE/LARGEST RELIABILITY VALUE |
| M4 | LOWEST RELIABILITY VALUE/LARGEST RELIABILITY VALUE |

FIG. 9
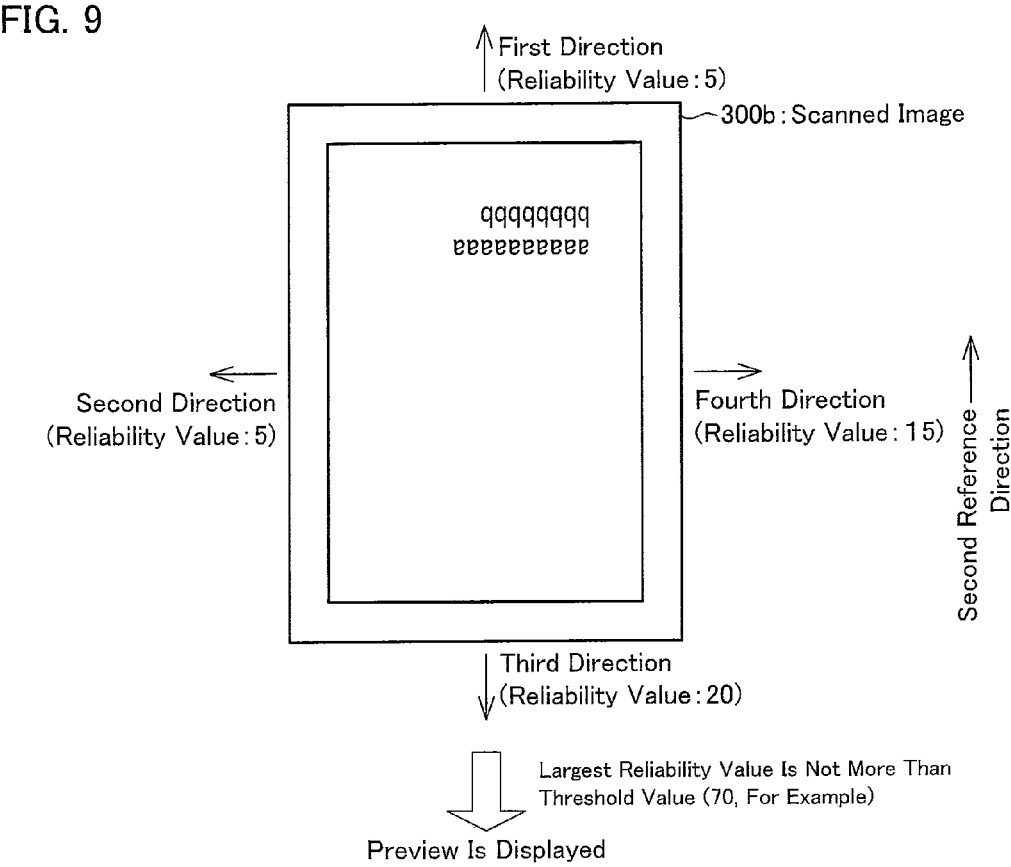
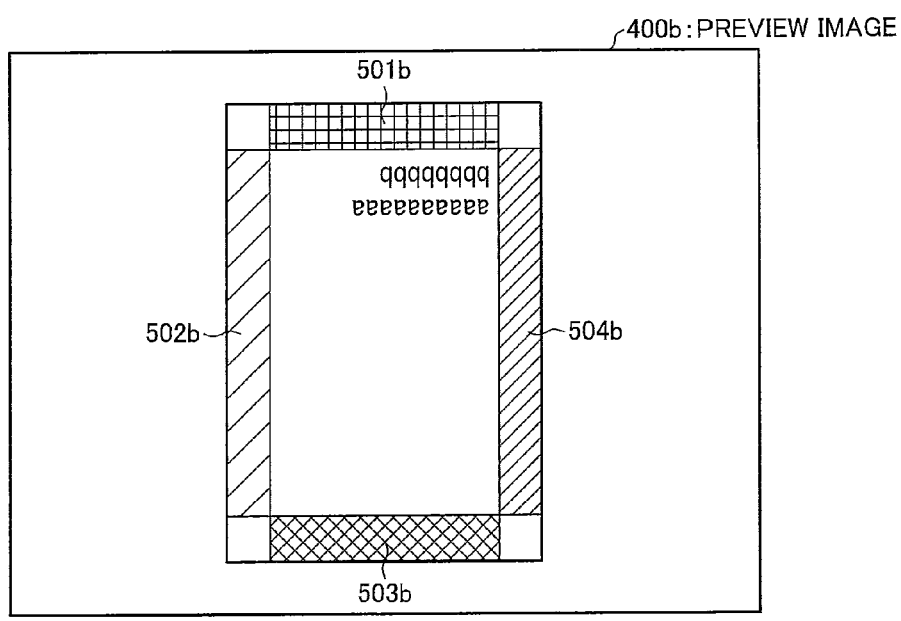

FIG. 12
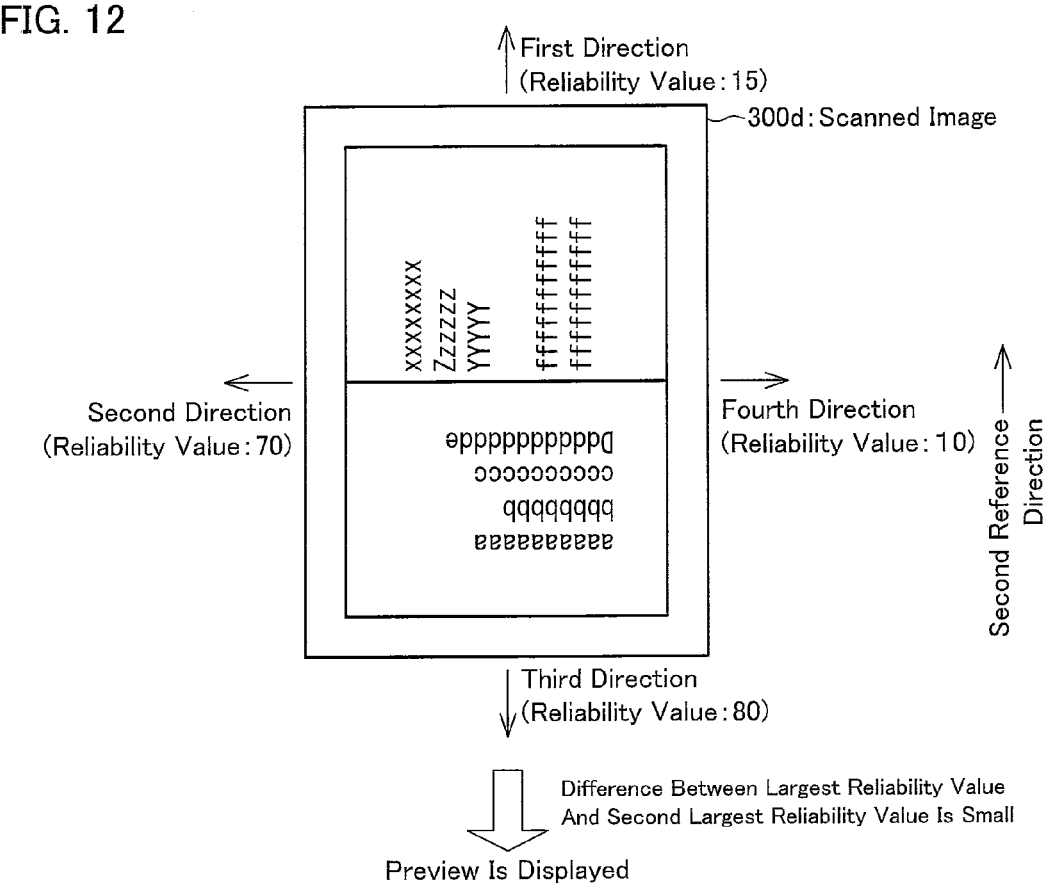
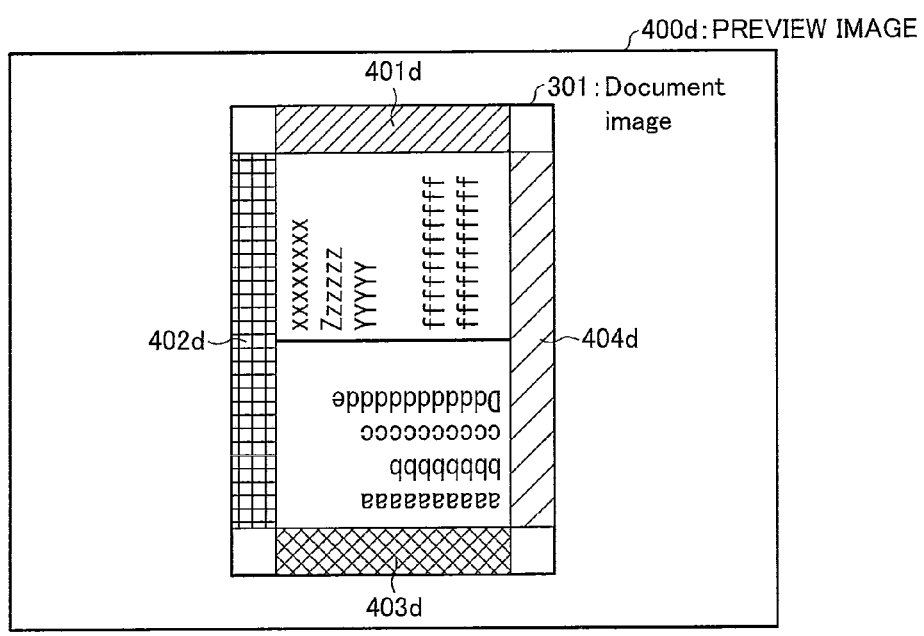

IMAGE PROCESSING APPARATUS, IMAGE FORMING APPARATUS, IMAGE READING APPARATUS, IMAGE PROCESSING METHOD, AND RECORDING MEDIUM

This Nonprovisional application claims priority under 35 U.S.C. §119(a) on Patent Application No. 2008-278226 filed in Japan on Oct. 29, 2008, the entire contents of which are hereby incorporated by reference.

TECHNICAL FIELD

The present invention relates to an image processing apparatus for processing image data for a thumbnail and image data for a preview.

BACKGROUND ART

Before a scanned image is printed out, an image forming apparatus, such as a copying machine and a multifunction printer, often displays a preview of a document image shown in the scanned image that has been image-processed in accordance with a processing condition set by a user. In a case where a plurality of documents are read, each of the documents may be print-previewed one by one, or the plurality of documents may be print-previewed collectively. The processing condition includes: a sort of a document; a print density; a ratio in enlarging/reducing processing; single-sided printing or two-sided printing; a binding margin size; and the like.

Patent Literature 1 discloses an image forming apparatus in which a preview of a document image is displayed so that a user can (i) check the document image and (ii) input command to carry out a rotation processing and a rotation angle. The image forming apparatus displays a checking icon for accepting a command to carry out rotation processing and setting of a rotation angle. A user inputs a command to carry out rotation processing and a rotation angle by clicking the checking icon. The rotation angle can be set to 0°, 90°, 180°, and 270°. According to the image forming apparatus disclosed in Patent Literature 1, a rotation direction is a clockwise direction. Specifically, if a user wants to rotate an image (scanned image), in which a document image is shown, at a right angle in a clockwise direction, the rotation angle is set to 90°, and if the user does not want to rotate the image, the rotation angle is set to 0°.

Patent Literature 1 teaches that when the image forming apparatus receives a command to carry out the rotation processing from a user, the image forming apparatus carries out the rotation processing with respect to an image (scanned image) in which a document image is shown, and then again displays a preview of the image after the rotation processing. Further, Patent Literature 1 teaches that the image forming apparatus displays a list of a plurality of documents images, and carries out the rotation processing collectively with respect to the plurality of documents images. Furthermore, Patent Literature 1 teaches that the image forming apparatus automatically determines a page orientation of a document image, and then displays a preview of the document image that has been rotated based on the page orientation automatically determined.

CITATION LIST

Patent Literature 1

Japanese Patent Application Publication, Tokukai, No. 2007-200280 A (Publication Date: Aug. 9, 2007)

Non Patent Literature 1

"Viewer with which a user can view images by touch operation (iPhone, for example)/S2V", [On Line], Wilcom Fan-site, Search Date: May 23, 2008, Internet <URL:http://www.willcom-fan.com/wzero3/entries/memn0ck/000431/>

SUMMARY OF INVENTION

Technical Problem

The image forming apparatus disclosed in Patent Literature 1 is simply arranged such that settable rotation angles are displayed on a monitor along with preview of a document image. With the arrangement, there are cases where a user has difficulty in judging the page orientation of the document image just by looking at the monitor. For example, in a case where the monitor is small or in a case where the size of the document image is small, the user has difficulty in recognizing the orientation of characters shown in the document image, and has therefore difficulty in recognizing the page orientation of the document image.

The present invention was attained in view of the above problems, and an object of the present invention is to provide an image processing apparatus in which a user can easily recognize a page orientation of a document image.

Solution to Problem

In order to attain the above object, the present invention provides an image processing apparatus for processing a scanned image which is read out from a document and in which a document image is shown, including: a reliability determining section which determines reliability of coincidences of respective first through fourth directions with a first reference direction, the first through fourth directions being directions pointing from a center of the document image toward respective four sides of the document image and being perpendicular to the respective four sides of the document image, the first reference direction being an upward direction of or a downward direction of the document image; and a display control section which creates markers indicating the respective first through fourth directions, and which causes a display device to display a preview image in which the markers and the scanned image overlap each other, the display control section causing the markers to be displayed in respective different ways in accordance with the reliability.

Advantageous Effects of Invention

According to the arrangement of the present invention, markers indicating respective first through fourth directions of a scanned image are displayed in respective different ways in accordance with reliability of coincidences of the respective first through fourth directions with a first reference direction. This makes it easy for a user to recognize a page orientation of a document image regardless of the size of the scanned image.

BRIEF DESCRIPTION OF DRAWINGS

FIG. 5(a) is a table showing how the order of the reliability value is associated with signs indicating respective density values. FIG. 5(b) is a table showing how the signs shown in FIG. 5(a) are associated with the density values. FIG. 5(c) is a table showing how the signs shown in FIG. 5(a) are associated with expressions concerning density.

FIG. 8(a) is a table showing how the order of the reliability value is associated with expressions for calculating sizes of the instruction marks. FIG. 8(b) is a table showing how signs included in the expressions of FIG. 8(a) are associated with magnification ratio. FIG. 8(c) is a table showing how the signs shown in FIG. 8(a) are associated with expressions concerning the magnification ratio.

FIG. 9 is a view for explaining processing of displaying a preview image in a case where the largest reliability value is not more than a threshold value.

FIG. 12 is a view for explaining processing of displaying a preview image in a case where a difference between the largest reliability value and the second largest reliability value is not more than a threshold value.

DESCRIPTION OF EMBODIMENTS

Embodiment 1

Figure 1:
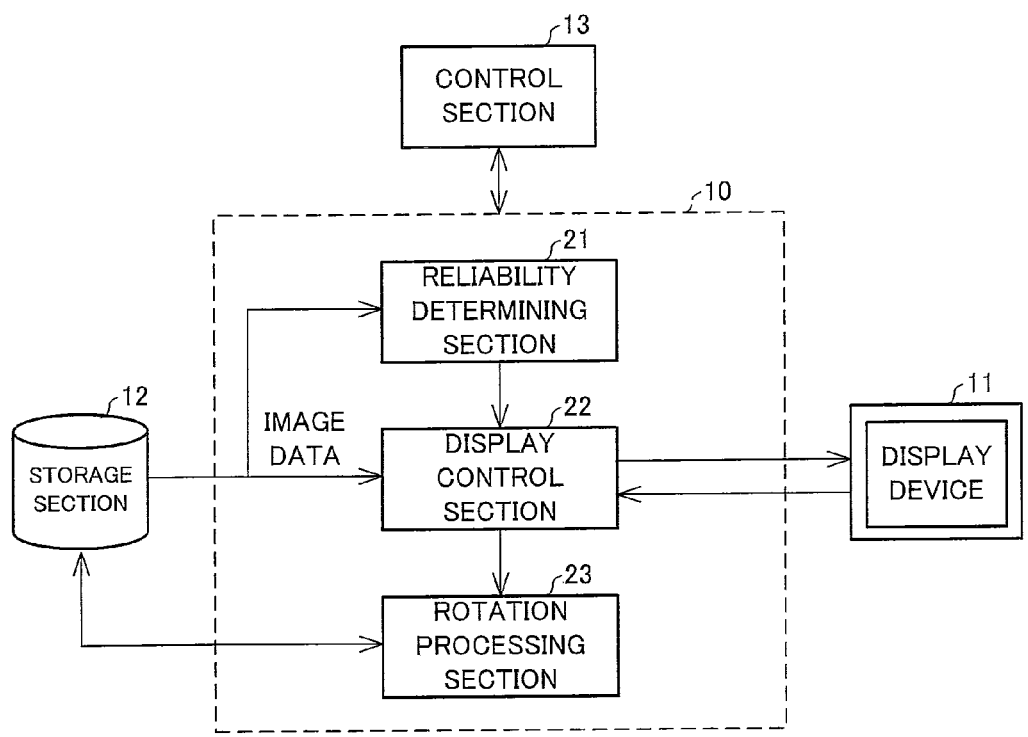
FIG. 1 is a block diagram showing one embodiment of an image processing apparatus of the present invention.

An embodiment of an image processing apparatus of the present invention is described below with reference to the attached drawings. FIG. 1 is a block diagram schematically illustrating an arrangement of an image processing apparatus 10 of the present embodiment.

The image processing apparatus 10 is provided in an image forming apparatus (a copying machine or a multifunction printer) including an image input apparatus (CCD line sensor) which scans a document so as to obtain an image (digital image). If an image is read from a document by the image input apparatus, the image processing apparatus 10 carries out image processing with respect to the image. Note that an image read from a document is hereinafter referred to as a scanned image. That is, the scanned image is an image in which an image of the document (hereinafter referred to as "document image") is shown.

As shown in FIG. 1, the image processing apparatus 10 is connected to a display device 11, a storage section 12, and a control section 13.

The display device 11 is image display means provided in an operation panel of the image forming apparatus. The display device 11 provides a user with various kinds of information concerning the image forming apparatus. The display device 11 is covered with a touch panel, and an image displayed on the display device 11 also serves as a graphical user interface. Note that the display device 11 can be general image display means such as a liquid crystal display.

The storage section 12 is data storage means provided in the image forming apparatus. The storage section 12 can be a general hard disc device, for example.

The control section 13 controls operations of the image processing apparatus 10, the storage section 12, display device 11, and the like. Further, the control section 13 controls: data communication within the image processing apparatus 10; data communication between the image processing apparatus 10 and the storage section 12; and data communication between the image processing apparatus 10 and the display device 11. Note that the control section 13 is a computer constituted by a CPU, a RAM, a ROM, and the like.

In the arrangement in FIG. 1, a scanned image obtained by the image input apparatus is stored in the storage section 12. The image processing apparatus 10 reads out the scanned image from the storage section 12, and then carries out image processing with respect to the scanned image. The scanned image that has been subjected to the image processing is stored in the storage section 12 again. The image processing apparatus 10 creates a preview image based on the scanned image, and causes the display device 11 to display the preview image.

The following description deals with details of an internal arrangement of the image processing apparatus 10. As shown in FIG. 1, the image processing apparatus 10 includes a reliability determining section 21, a display control section 22, and a rotation processing section 23.

(Reliability Determining Section 21)

The reliability determining section 21 is a block which, when a scanned image is created by the image input apparatus, and then is stored in the storage section 12, determines reliability (likelihood, confidence) of coincidences of respective first through fourth directions of the scanned image with a first reference direction (later described). More specifically, the reliability determining section 21 outputs a reliability value (likelihood value, confidence value) for each of the first direction, the second direction, the third direction, and the fourth direction. Note that the higher the reliability is, the larger the reliability value (likelihood value, confidence value) becomes.

FIG. 2(a) shows a scanned image 300 read from a document placed on a scanner platen, and FIG. 2(b) shows a preview image 400 created based on the scanned image 300 of FIG. 2(a). The first reference direction used herein refers to an upward direction of a document image 301 shown in the scanned image 300 (direction pointing from a lower side of the document image 301 toward an upper side of the document image 301) (see FIG. 2(a)).

Figure 2:
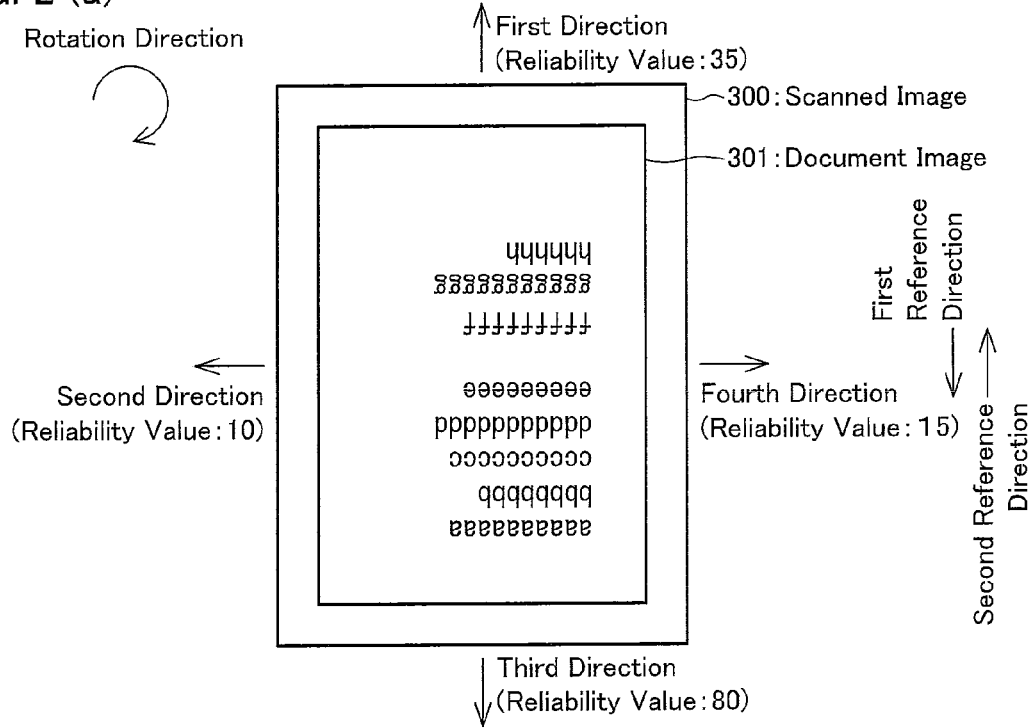
FIG. 2(a) shows a scanned image in which a document image is shown.
FIG. 2(b) shows a preview image created based on the scanned image of FIG. 2(a).
Figure 2:
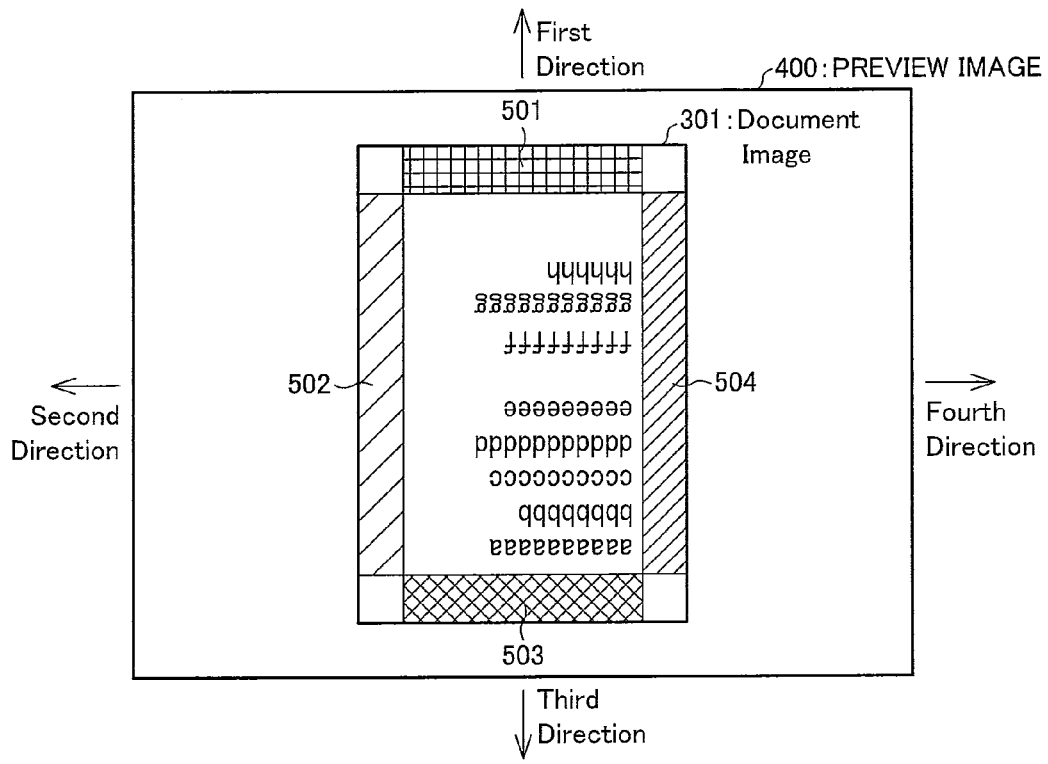

In the present embodiment, an upward direction of the scanned image 300 (direction pointing from a lower side of the scanned image 300 toward an upper side of the scanned image 300) is referred to as a second reference direction (see FIG. 2). In an example of FIG. 2, the scanned image is read from the document so that the first reference direction is reverse to the second reference direction.

The first through fourth directions in the scanned image 300 are directions pointing from a center of the document image 301 shown in the scanned image 300 toward respective sides of the document image 301, and are perpendicular to the respective sides of the document image 301 (see FIG. 2). Here, the first direction is a direction which coincides with the second reference direction before the scanned image 300 is subjected to rotation processing of the rotation processing section 23 (later described) (see FIG. 2).

The second direction is a direction perpendicular to the second reference direction before the scanned image 300 is subjected to rotation processing of the rotation processing section 23, and coincides with the second reference direction in a case where the scanned image 300 is subjected to rotation processing of the rotation processing section 23 so as to be rotated at 90° (see FIG. 2). The third direction is a direction reverse to the second reference direction before the scanned image 300 is subjected to rotation processing of the rotation processing section 23, and coincides with the second reference direction in a case where the scanned image 300 is subjected to rotation processing of the rotation processing section 23 so as to be rotated at 180° (see FIG. 2). The fourth direction is a direction perpendicular to the second reference direction before the scanned image 300 is subjected to rotation processing of the rotation processing section 23, and coincides with the second reference direction in a case where the scanned image 300 is subjected to rotation processing of the rotation processing section 23 so as to be rotated at 270° (see FIG. 2).

In an example of FIG. 2, the reliability determining section 21 determines reliability values of the respective first through fourth directions. In the example of FIG. 2 in which the first reference direction highly likely coincides with the third direction, a reliability value of the first direction is 35, a reliability value of the second direction is 10, a reliability value of the third direction is 80, and a reliability value of the fourth direction is 15, for example.

The reliability values are determined as follows. Note that the following procedure is based on the procedure disclosed in Japanese Patent Application Publication, Tokukaihei, No. 6-189083.

(1) First, based on an OCR (Optical Character Recognition) technique, the reliability determining section 21 recognizes character images of the document image 301 shown in the scanned image 300, and develops a pattern for each of the character images.

(2) Next, the reliability determining section 21 compares inputted character patterns obtained from the document image in the scanned image 300 with stored character patterns which has been included in a database in advance (matching). In this comparison, an inputted character pattern and stored character patterns are caused to overlap each other so as to determine whether or not the inputted character pattern and one of the stored character patterns are identical with each other in color (black and white). If all of the pixels of the inputted character pattern and all of the pixels of one of the stored character patterns are identical with each other in color (black and white), the inputted character pattern and the stored character pattern are determined as being "Identical".

(3) Further, if the database has no stored character pattern that is identical with the inputted character pattern in color (black and white) in all pixels, a stored character pattern having the largest number of pixels that are identical with those of the inputted character pattern in color (black and white) is selected. Then, the inputted character pattern and the selected stored character pattern are determined as being "Identical".

(4) If the database has no stored character pattern having not less than a predetermined number of pixels that are identical with those of the inputted character pattern in color (black and white), it will be decided that the comparison is impossible.

(5) The reliability determining section 21 carries out the procedure (1) through (4) with respect to all of the inputted character patterns, and counts the number of characters determined as "Identical".

(6) The reliability determining section 21 carries out rotation processing (rotation in a direction shown in FIG. 2 (i.e. clockwise direction)) at a rotation angle of 90° with respect to all of the inputted character patterns, carries out procedure (1) through (4) with respect to all of the inputted character patterns which have been subjected to the rotation processing, and counts the number of characters determined as "Identical".

(7) The reliability determining section 21 carries out processing similar to (6) at a rotation angle of 180°. Further, the reliability determining section 21 carries out processing similar to (6) at a rotation angle of 270°.

(8) The reliability determining section 21 determines, as a reliability value of the first direction, the number of characters determined as "Identical" in the comparing processing carried out with respect to inputted character patterns which is not subjected to rotation processing (inputted character patterns at a rotation angle of 0°). The reliability determining section 21 determines, as a reliability value of the second direction, the number of characters determined as "Identical" in the comparing processing carried out with respect to inputted character patterns which has been subjected to rotation processing at a rotation angle of 90°. The reliability determining section 21 determines, as a reliability value of the third direction, the number of characters determined as "Identical" in the comparing processing carried out with respect to inputted character patterns which has been subjected to rotation processing at a rotation angle of 180°. The reliability determining section 21 determines, as a reliability value of the fourth direction, the number of characters determined as "Identical" in the comparing processing carried out with respect to inputted character patterns which has been subjected to rotation processing at a rotation angle of 270°.

Figure 3:
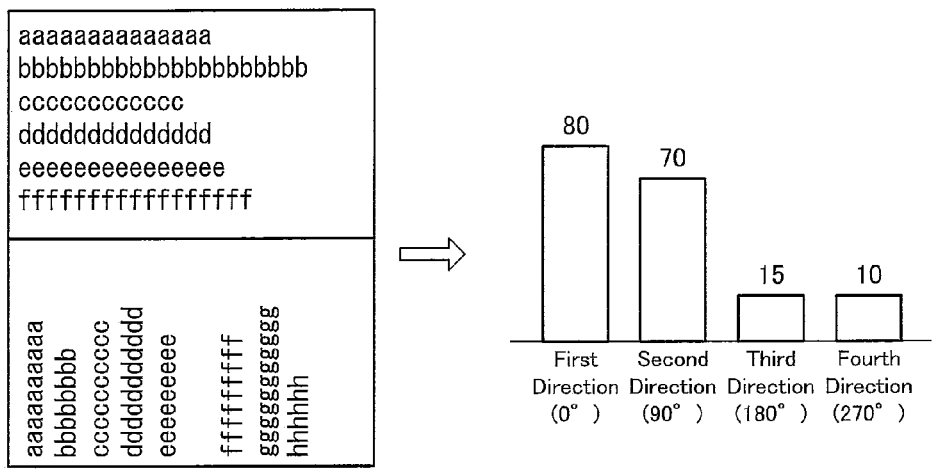
FIG. 3(a) is a view showing reliability values of respective first through fourth directions of a scanned image showing a document image in which (i) characters facing the first direction and (ii) characters facing the second direction are mixed.
FIG. 3(b) is a view showing reliability values of the respective first through fourth directions of a scanned image showing a document image in which only characters facing the first direction is shown.
FIG. 3(c) is a view showing reliability values of the respective first through fourth direction of a scanned image showing a document image which contain a small number of characters.
Figure 3:
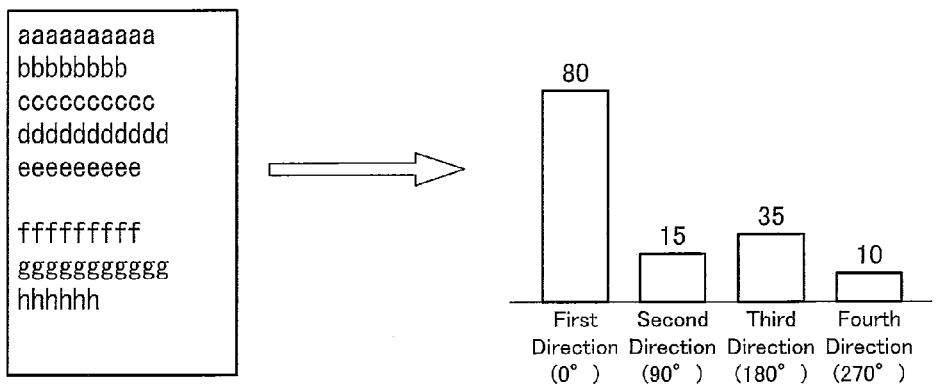
Figure 3:
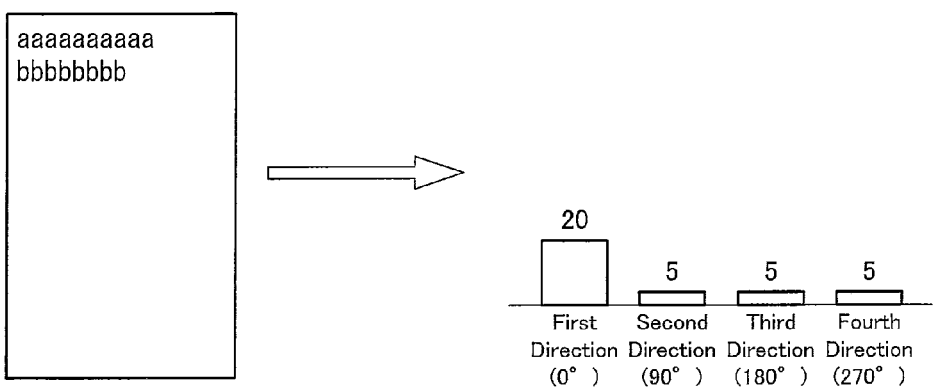

For example, in a case where all of characters face the same direction as in FIG. 3(b), only a reliability value of one of the directions becomes large. In a case where (i) a character group which faces one direction and (ii) a character group which faces another direction are mixed in the document image 301 as in FIG. 3(a), only reliability values of two of the directions become large, and reliability values of the other directions become small. In a case where the number of characters shown in the document image 301 is small as in FIG. 3(c), all of the directions have a small reliability value.

(Display Control Section 22)

The following description deals with the display control section 22 shown in FIG. 1. The display control section 22 shown in FIG. 1 reads out a scanned image 300 (see FIG. 2(a)) stored in the storage section 12, and carries out downsampling and instruction mark forming processing with respect to the scanned image 300 so as to create a preview image 400 (see FIG. 2(b)). The display control section 22 then causes the display device 11 to display the preview image 400. The downsampling and the instruction mark forming processing are described below in detail.

(Downsampling)

The display control section 22 reads out a scanned image 300 stored in the storage section 12, and then downsamples the scanned image 300 so as to downsize the scanned image 300. The scanned image 300 is downsampled so that an entire document image 301 shown in the scanned image 300 that has been subjected to the downsampling is displayed on the display device 11. Further, the downsampling is carried out by an interpolation process, such as a nearest neighbor method, a bilinear method, or a bicubic method, for example.

The nearest neighbor method is a method in which either a value of an existing pixel that is closest to the interpolation pixel generated by an interpolation, or a value of an existing pixel that is in a predetermined positional relationship with the interpolation pixel is provided as a value of an interpolation pixel. The bilinear method is a method in which (i) a weighted average value of values of four existing pixels surrounding an interpolation pixel (a weight is a factor proportional to a distance from the interpolation pixel to an existing pixel) is obtained, and (ii) the obtained value is provided as a value of the interpolation pixel. The bicubic method is a method in which interpolation calculations are carried out by use of a total of 16 existing pixels (the four existing pixels surrounding the interpolation pixel, and 12 existing pixels surrounding said four existing pixels).

(Instruction Mark Forming Processing)

The display control section 22 also carries out processing of forming instruction marks (touch areas) 501 through 504 with respect to the scanned image 300 which has been subjected to downsampling. The display control section 22 determines, as a preview image 400, the scanned image 300 on which the instruction marks 501 through 504 are formed.

As shown in FIG. 2(b), the instruction mark 501 overlaps the document image 301 in the preview image 400 so as to be positioned in the first direction side. Thus, the instruction mark 501 serves as a marker indicating the first direction. As shown in FIG. 2(b), the instruction mark 502 overlaps the document image 301 in the preview image 400 so as to be positioned in the second direction side. Thus, the instruction mark 502 serves as a marker indicating the second direction.

As shown in FIG. 2(b), the instruction mark 503 overlaps the document image 301 in the preview image 400 so as to be positioned in the third direction side. Thus, the instruction mark 503 serves as a marker indicating the third direction. As shown in FIG. 2(b), the instruction mark 504 overlaps the document image 301 in the preview image 400 so as to be positioned in the fourth direction side. Thus, the instruction mark 504 serves as a marker indicating the fourth direction.

The instruction mark forming processing is such that (i) positions (coordinates) where the instruction marks 501 through 504 overlap the document image 301 shown in the scanned image 300 which has been subjected to downsampling are obtained, and (ii) the scanned image 300 is image-processed so that the instruction marks 501 through 504 overlap the document image 301 in the obtained positions, respectively. The following description deals with a method of obtaining positions where the instruction marks 501 through 504 overlap the document image 301. Note that the following description deals with, as an example, a method of obtaining a position where the instruction mark 502 overlaps the document image 301.

Figure 4:
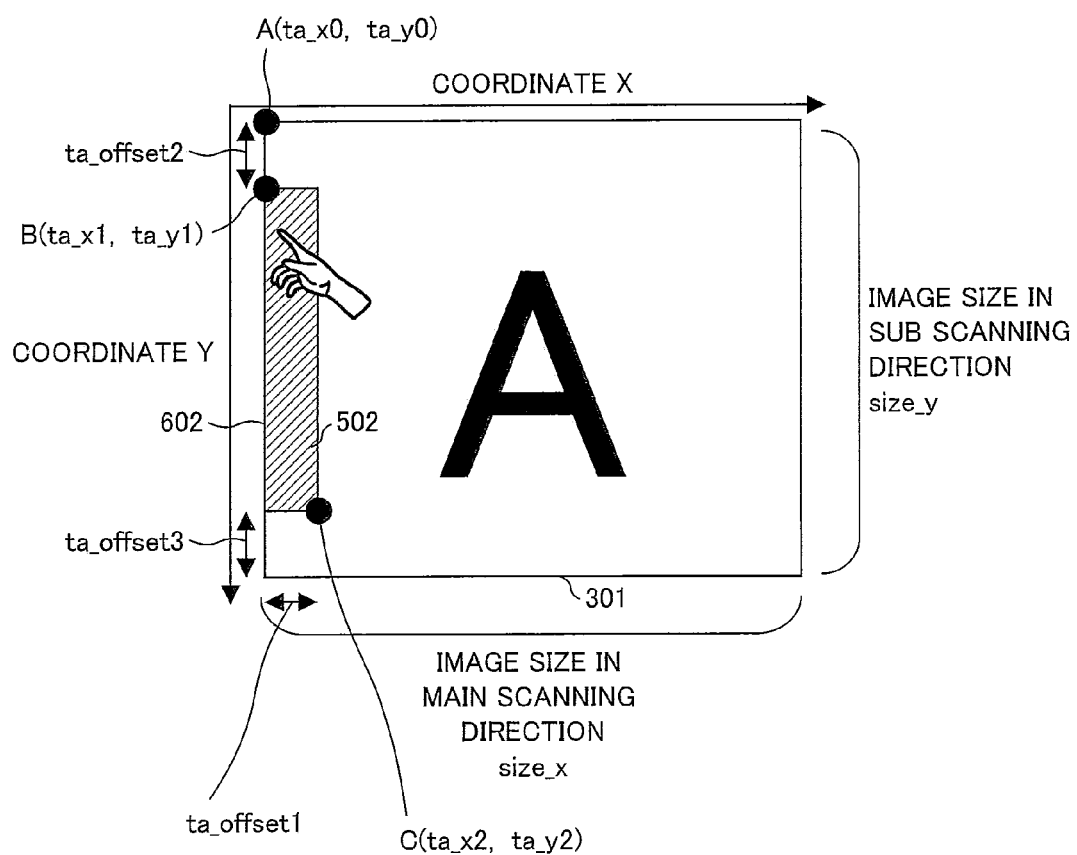
FIG. 4 is a view for explaining a method for determining positions of respective instruction marks.

As shown in FIG. 4, the display control section 22 finds a side 602 of the document image 301 which is in the second direction side, and provides an end of the side 602 as a coordinate A ($ta\_x0$, $ta\_y0$). The coordinate A ($ta\_x0$, $ta\_y0$) satisfies the following formulas 1 and 2. Further, the display control section 22 finds a coordinate B ($ta\_x1$, $ta\_y1$) which satisfies the following formulas 3 and 4, and a coordinate C ($ta\_x2$, $ta\_y2$) which satisfies the following formulas 5 and 6.

$$ta\_x0=0 \qquad \text{Formula 1.}$$

$$ta\_y0=0 \qquad \text{Formula 2}$$

$$ta\_x1=0 \qquad \text{Formula 3.}$$

$$ta\_y1=ta\_offset2 \qquad \text{Formula 4.}$$

$$ta\_x2=ta\_offset1 \qquad \text{Formula 5.}$$

$$ta\_y2=(size\_y)-1-(ta\_offset3) \qquad \text{Formula 6.}$$

The display control section 22 provides the coordinate B ($ta\_x1$, $ta\_y1$) and the coordinate C ($ta\_x2$, $ta\_y2$) as vertexes in the document image 301, and sets such a rectangle region that a straight line between the vertexes is a diagonal line of the rectangle region. Then, the display control section 22 determines all pixels included in the rectangle region as a region of the instruction mark 502. Further, the display control section 22 determines regions of the instruction marks 501, 503 and 504 by a method similar to the method of determining the region of the instruction mark 502.

Further, the display control section 22 causes the instruction marks 501 through 504 to be displayed in respective different ways by changing their respective densities in accordance with reliability values of the respective directions indicated by the respective instruction marks 501 through 504 (see FIG. 2(a)). More specifically, the display control section 22 causes the instruction marks 501 through 504 to be displayed in the respective different ways by changing their respective densities in accordance with the order of the reliability values (order of largeness of the reliability values) of the respective directions indicated by the respective instruction marks 501 through 504. This is described below in detail.

In the present embodiment, the display control section 22 sets the densities of the respective instruction marks 501 through 504 so that an instruction mark indicating a direction which is ranked higher in the order of the reliability values (in the order of largeness of the reliability values) of the respective directions is higher in density. Specifically, in the example of FIG. 2, the instruction mark 503 which indicates the third direction having a reliability value of 80 is the highest in density, the instruction mark 501 which indicates the first direction having a reliability value of 35 is the second highest in density, the instruction mark 504 which indicates the fourth direction having a reliability value of 15 is the third highest in density, and the instruction mark 502 which indicates the second direction having a reliability value of 10 is the lowest in density.

The following description deals with how to set the densities of the respective instruction marks 501 through 504 in accordance with the order of the reliability values of the respective directions indicated by the respective instruction marks 501 through 504. For example, as shown in FIGS. 5(a) and 5(b), a combination of tables in which the order of reliability value is associated with density values is stored in the storage section 12. The display control section 22 determines the order of reliability value with respect to the first through fourth directions on the basis of reliability values of the first through fourth directions which are determined by the reliability determining section 22. The display control section 22 then reads out, from the tables shown in FIGS. 5(a) and 5(b), density values of the respective first through fourth directions in accordance with the order of the reliability values. For example, according to the tables of FIGS. 5(a) and 5(b), an instruction mark which indicates a direction whose reliability value is ranked first in the order of the reliability value has a density value of (R, G, B)=(20, 0, 127), and an instruction mark which indicates a direction whose reliability value is ranked second in the order of the reliability value has a density value of (R, G, B)=(75, 0, 127). Note that, in FIG. 5, the higher the density becomes, the lower the density value becomes.

A combination of tables in which the order of the reliability value is associated with density values is not limited to the combination of the table of FIG. 5(a) and the table of FIG. 5(b). For example, a combination of the table of FIG. 5(a) and a table of FIG. 5(c) is possible. According to this combination, it is possible to cause density values of respective instruction marks to be changed in accordance with a ratio of a reliability value to the highest reliability value. Further, according to the combination of the table of FIG. 5(a) and the table of FIG. 5(c), it is possible to cause a density value of an instruction mark which indicates a direction whose reliability value is not ranked first in the order of the reliability value to be changed in accordance with the reliability value of the direction.

After the downsampling and the instruction mark forming processing, the display control section 22 carries out gradation correction processing (gamma correction) with respect to the preview image 400 (see FIG. 2(b)) created through the downsampling and the instruction mark forming processing, and then displays the preview image 400 that has been subjected to the tone correction processing on the display device 11. Note that the tone correction processing is tone conversion processing carries out in accordance with display characteristics of the display device 11.

(Rotation Processing Section 23)

The following description deals with the rotation processing section 23 shown in FIG. 1. The rotation processing section 23 shown in FIG. 1 is a block which, in a case where a user selects one of the instruction marks 501 through 504 shown in the preview image 400 displayed on the display device 11, (i) reads out the scanned image 300 stored in the storage section 12, and (ii) carries out rotation processing with respect to the read-out scanned image 300 in a rotation direction shown in FIG. 2(a) (i.e. in a clockwise direction).

More specifically, the rotation processing section 23 carries out the rotation processing with respect to the scanned image 300 so that a direction indicated by the indication mark selected by the user coincides with the second reference direction (upward direction of the scanned image 300) of the scanned image 300 which has been subjected to the rotation processing.

That is, in a case where the user selects the instruction mark 503 of FIG. 2(b), the scanned image 300 shown in FIG. 2(a) is subjected to rotation processing at a rotation angle of 180° in a clockwise direction. In a case where the user selects the instruction mark 504 of FIG. 2(b), the scanned image 300 shown in FIG. 2(a) is subjected to rotation processing at a rotation angle of 270° in a clockwise direction (rotated at 270° in a clockwise direction). In a case where the user selects the instruction mark 502 of FIG. 2(b), the scanned image 300 shown in FIG. 2(a) is subjected to rotation processing at a rotation angle of 90° in a clockwise direction (rotated at 90° in a clockwise direction).

The scanned image 300 stored in the storage section 12 may be overwritten with the scanned image 300 that has been subjected to the rotation processing. Alternatively, the scanned image 300 that has been subjected to the rotation processing may be outputted from the image processing apparatus 10 so as to be subjected to print processing. Alternatively, the scanned image 300 that has been subjected to the rotation processing may be transmitted to an external device.

Note that a user may select one of the instruction marks 501 through 504 using a cursor displayed in the display device 11. In a case where the display device 11 has a touch panel, the user may select one of the instruction marks 501 through 504 by touching the one of the instruction marks 501 through 504. That is, each of the instruction marks 501 through 504 of the present embodiment functions as a graphical user interface, and also functions as a button for a user to input a command to carry out rotation processing or set a rotation angle.

(Processing Flow)

Figure 6:
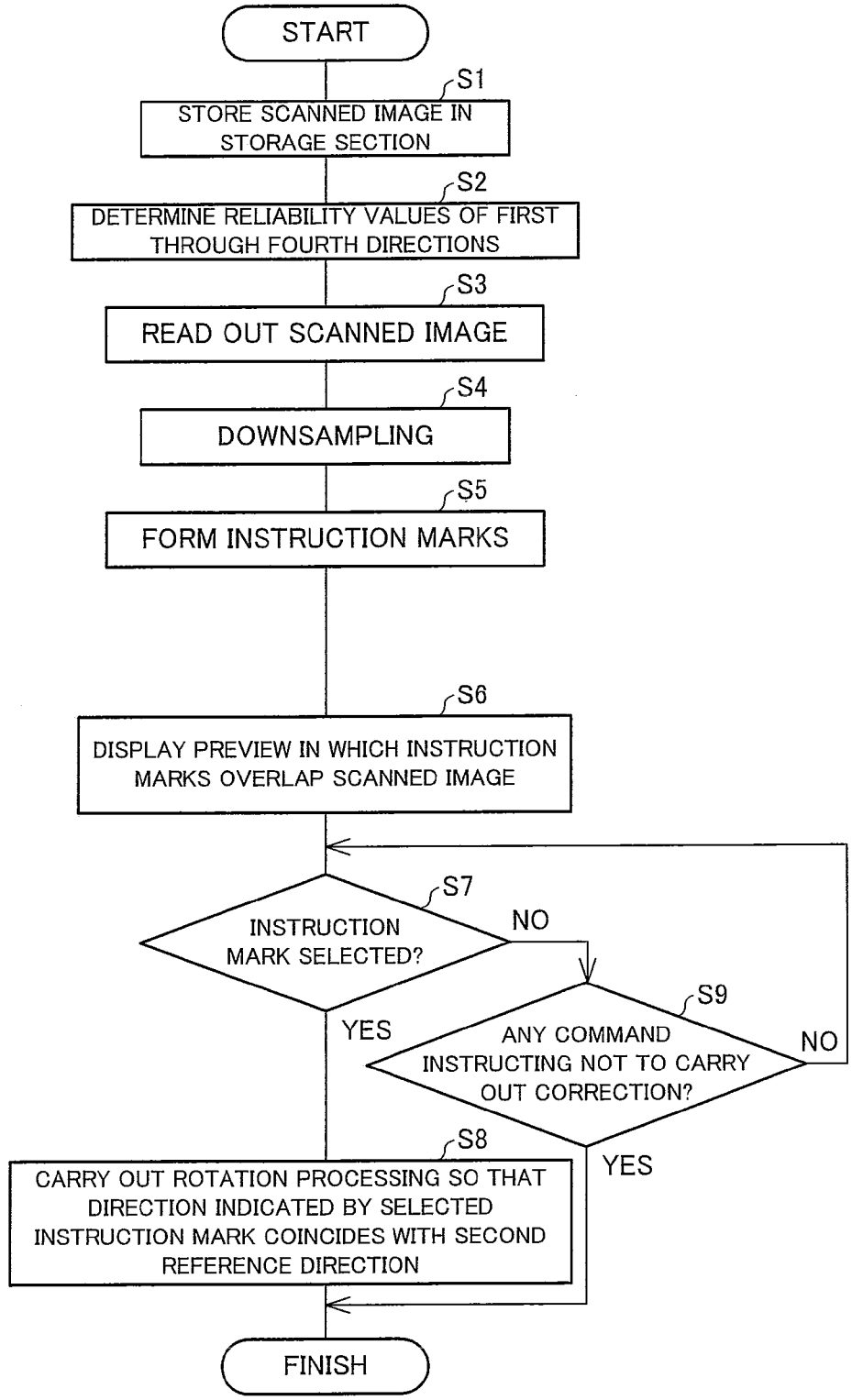
FIG. 6 is a flow chart showing a procedure of processing carried out in the Embodiment 1.

The following description deals with a procedure of processing of the image processing apparatus 10 with reference to FIG. 6. FIG. 6 is a flow chart showing a flow of processing carried out in the Embodiment 1.

First, if a scanned image is read from a document by the image input apparatus (scanner), the scanned image is stored in the storage section 12 (S1). Next, the reliability determining section 21 refers to the scanned image 300 stored in the storage section 12 so as to determine reliability values of the respective first through fourth directions in the scanned image 300 (S2), the reliability values indicating reliability of coincidences of the respective first through fourth directions with the first reference direction (upward direction of the document image 301 shown in the scanned image 300). Subsequently, the display control section 22 reads out the scanned image 300 from the storage section 12 (S3), and then carries out downsampling with respect to the scanned image 300 (S4).

After S4, the display control section 22 forms instruction marks 501 through 504 indicating the respective first through fourth directions on the basis of the scanned image 300 that has been subjected to the downsampling and the reliability values of the respective first through fourth directions (S5). The display control section 22 then causes the display device 11 to display a preview image in which the instruction marks 501 through 504 overlap the scanned image 300 that has been subjected to the downsampling (S6).

After S6, in a case where a user selects one of the instruction marks 501 through 504 ("Yes" in S7), the rotation processing section 23 reads out the scanned image stored in the storage section 12, and then carries out rotation processing with respect to the read-out scanned image (S8). Here, the processing of the rotation processing section 23 is finished. Note that the rotation processing section 23 carries out rotation processing with respect to the scanned image 300 so that a direction indicated by the instruction mark selected by the user coincides with the second reference direction (upward direction of the scanned image 300) of the scanned image 300 that has been subjected to the rotation processing.

Further, after S6, if the image processing apparatus 10 receives, via an operation panel (not shown) or the like, a command indicating that correction is unnecessary ("No" in S7, and "Yes" in S9), the processing is finished without the rotation processing being carried out.

According to the arrangement, the instruction marks 501 through 504 indicating the respective first through fourth directions are caused to be displayed in respective different ways by changing their respective densities in accordance with reliability of coincidences of the respective first through fourth directions with the first reference direction (see FIG. 2). This allows a user to easily recognize a page orientation of the document image. Therefore, it becomes easy for a user to determine whether correction of document orientation (rotation processing in the present embodiment) is necessary or not and to determine a rotation angle in the rotation processing.

The display control section 22 causes the instruction marks 501 through 504 to be displayed in respective different ways by changing respective densities in accordance with the order of the reliability. However, the present invention is not limited to the embodiment in which the instruction marks 501 through 504 are caused to be displayed in respective different ways by changing respective densities. Alternatively, the display control section 22 may cause the instruction marks 501 through 504 to be displayed in respective different ways by changing respective colors in accordance with the order of reliability. For example, it is possible that color of an instruction mark indicating a direction which has the largest reliability value is red, color of an instruction mark indicating a direction which has the second largest reliability value is green, color of an instruction mark indicating a direction which has the third largest reliability value is blue, and color of an instruction mark indicating a direction which has the lowest reliability value is yellow.

Figure 7:
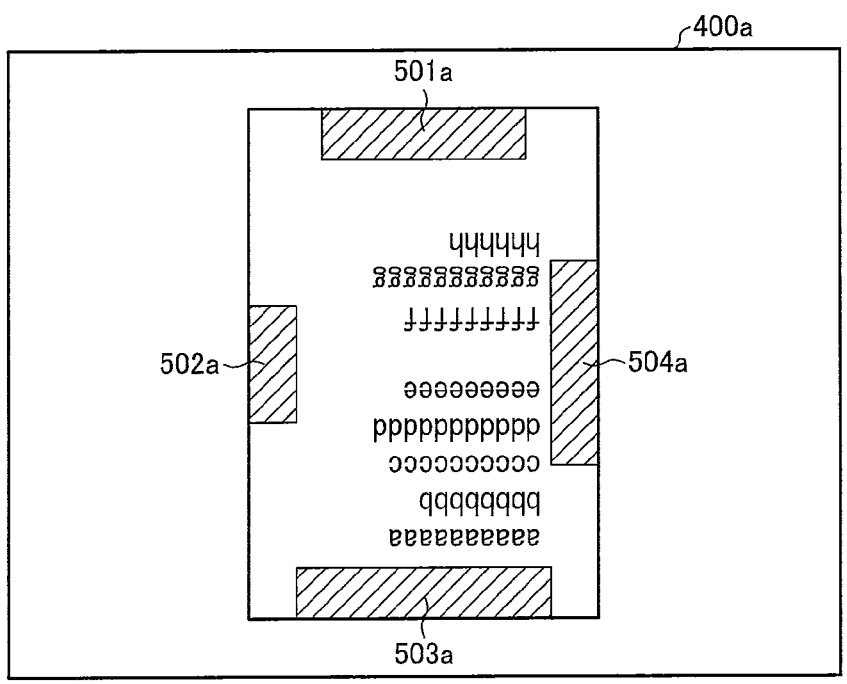
FIG. 7 is a view showing a preview image which is created based on the scanned image of FIG. 2(a) and in which instruction marks having respective different sizes are formed.

Further, the display control section 22 may cause the instruction marks 501 through 504 to be displayed in respective different ways by changing respective sizes in accordance with the order of the reliability. For example, it is possible that an instruction mark which indicates a direction having higher reliability is larger in size. In this case, instruction marks 501a through 504a of a preview image 400a created based on the scanned image 300 shown in FIG. 2(a) are as shown in FIG. 7. Note that the instruction mark 501a indicates the first direction, the instruction mark 502a indicates the second direction, the instruction mark 503a indicates the third direction, and the instruction mark 504a indicates the fourth direction. Next, one example of a method for setting the size of instruction marks is described. For example, a combination of tables in which the order of the reliability value is associated with the size of instruction marks is stored in the storage section 12 (see FIGS. 8(a) and 8(b)), and the size (pixel number) is set in accordance with the order of the reliability value with reference to the tables. The formulas 1 through 6 are appropriately corrected so that each of the instruction marks has the size that has been set. According to the combination of the table of FIG. 8(a) and the table of FIG. 8(b), an instruction mark which indicates a direction having higher reliability is larger in size.

Further, a combination of the table of FIG. 8(a) and a table of FIG. 8(c) can be used to set the size (pixel number) in accordance with the order of the reliability value. According to the combination of the table of FIG. 8(a) and the table of FIG. 8(c), it is possible to cause the size of an instruction mark to be changed in accordance with a ratio of a reliability value of a direction indicated by the instruction mark to the largest reliability value. Further, it is possible to cause the size of an instruction mark indicating a direction which does not have the largest reliability value to be changed in accordance with a reliability value of the direction.

The instruction marks 501 through 504 are displayed in respective different ways by changing respective densities, colors, or sizes. In addition to this, an instruction mark indicating a direction having the highest reliability may be caused to blink.

Further, according to the present embodiment, the image processing apparatus 10 is provided in the image forming apparatus. However, the present invention is not limited to this. The image processing apparatus 10 may be provided in a personal computer or may be provided in a portable terminal such as a portable phone or a PDA.

Embodiment 2

According to the Embodiment 2, in a case where the largest reliability value (reliability value of a direction that is ranked first in the order of the reliability value) of reliability values of the first through fourth directions of a scanned image 300 is larger than a threshold value, a preview image is not displayed, and rotation processing is automatically carried out, whereas in a case where the largest reliability value is not more than the threshold value, the preview image is displayed. This embodiment is described below in detail.

Figure 10:
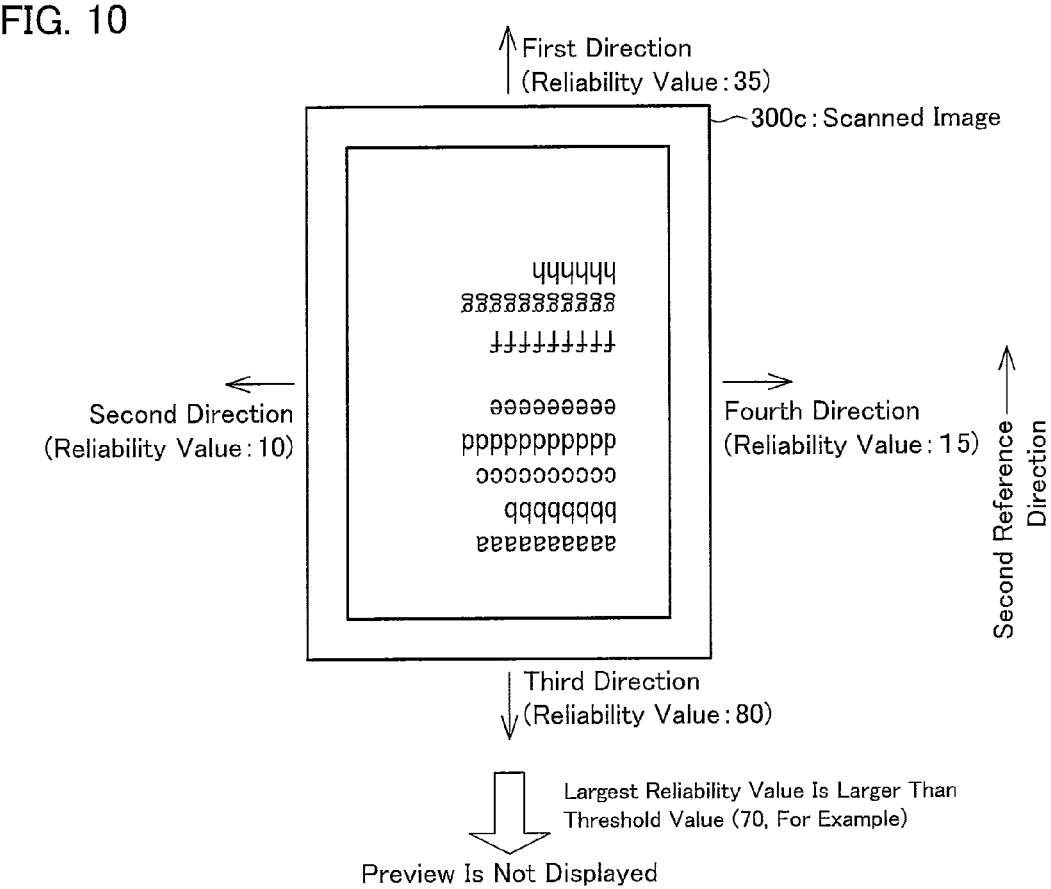
FIG. 10 is a view for explaining processing of not displaying a preview image in a case where the largest reliability value is larger than a threshold value.

In a case where the largest reliability value (reliability value of a direction that is ranked first in the order of the reliability value) of reliability values of the first through fourth directions of a scanned image 300c is larger than a predetermined threshold value (see FIG. 10), a direction corresponding to the largest reliability value almost surely coincides with the first reference direction. Therefore, in this case, as shown in FIG. 10, a preview image is not displayed, and rotation processing is automatically carried out so that the direction having the largest reliability value coincides with the second reference direction after the rotation processing. This saves labor and time for a user. Note that the fact that the largest reliability value is larger than the threshold value means that the number of samples which are used in determining reliability values is large (the number of characters in the document image is large) (see FIG. 10). Therefore, the reliability values are highly reliable data.

In contrast, in a case where the largest reliability value of reliability values of the first through fourth directions of a scanned image 300b is not more than a predetermined threshold value (see FIG. 9), a direction corresponding to the largest reliability value highly likely coincides with the first reference direction, but there is a little possibility that the direction corresponding to the largest reliability value does not coincide with the first reference direction. Therefore, in this case, in a case where rotation processing is automatically carried out so that the direction corresponding to the largest reliability value coincides with the second reference direction after the rotation processing, there is a possibility that the rotation processing is incorrectly carried out. In this case, as shown in FIG. 9, in order to prevent incorrect rotation processing from being automatically carried out, a preview image 400b corresponding to the scanned image 300b should be displayed so that a user is urged to determine whether the rotation processing is necessary or not and to input a rotation angle.

In view of this, according to the present embodiment, in a case where the largest reliability value of reliability values determined by the reliability determining section 21 is larger than a threshold value, a preview image is not displayed, and rotation processing is automatically carried out, whereas in a case where the largest reliability value is not more than the threshold value, the preview image is displayed. With this arrangement, it is possible (i) to prevent incorrect rotation processing from being automatically carried out and (ii) to save labor and time for a user.

Figure 11:
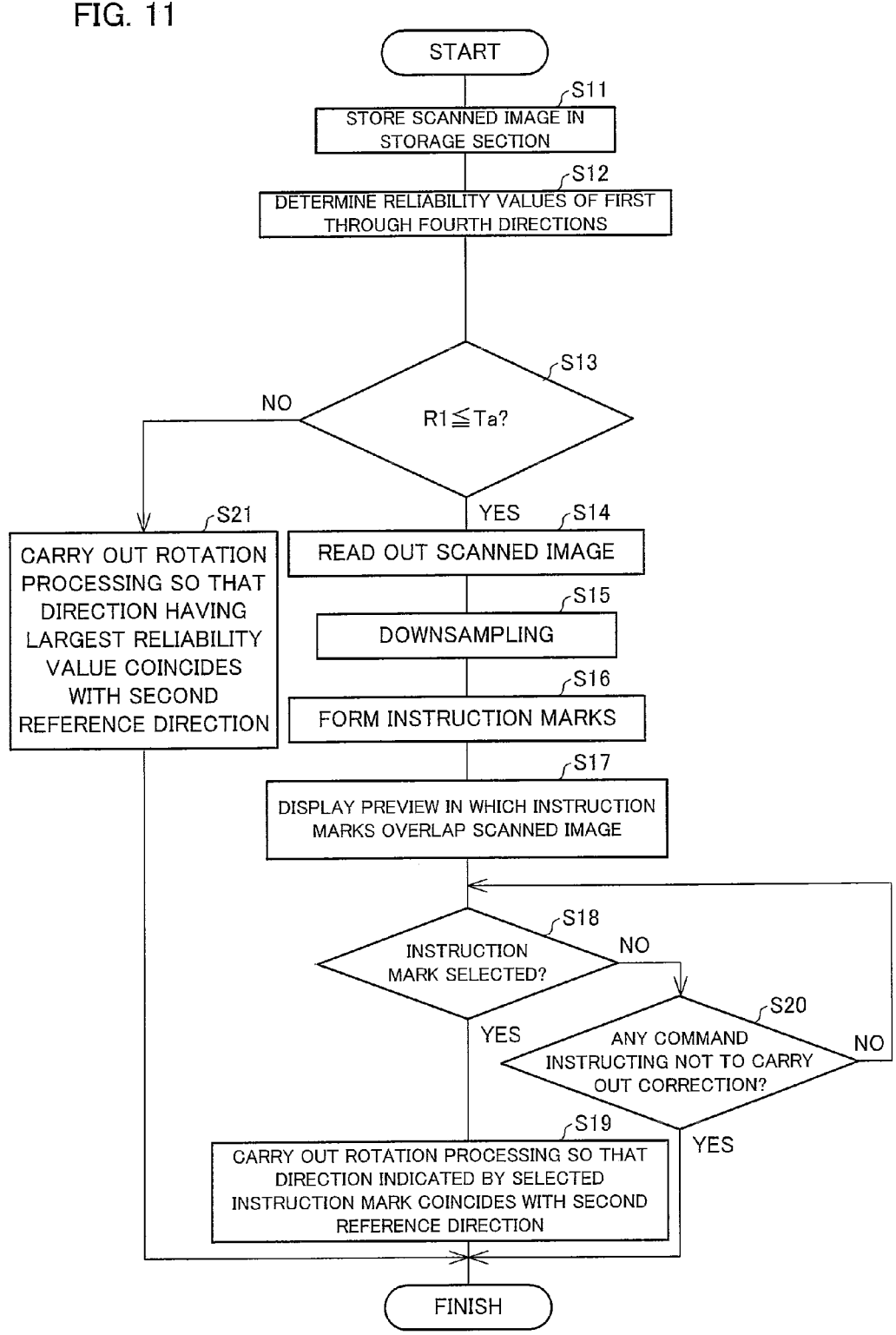
FIG. 11 is a flow chart showing a flow of processing carried out in the Embodiment 2.

FIG. 11 is a flow chart showing a flow of processing carried out in the present embodiment. S11 and S12 of FIG. 11 are similar to S1 and S2 of FIG. 6, respectively, and S14 through S20 of FIG. 11 are identical to S3 through S9 of FIG. 6, respectively. Therefore, S11, S12, and S14 through S20 are not explained here in detail.

In the flow of FIG. 11, after S12, a determining section (not shown) determines, as R1, the largest reliability value of reliability values of the first through fourth directions, and judges whether R$1 \leq$Ta is satisfied or not (S13). Note that Ta is a threshold value, and is set to 70, for example.

If it is determined that R$1 \leq$Ta is not satisfied in S13, the display control section 22 causes the display device 11 not to display a preview image, and the rotation processing section 23 automatically carries out rotation processing with respect to a scanned image so that a direction having the largest reliability value coincides with the second reference direction after the rotation processing (S21). In contrast, if it is determined that R$1 \leq$Ta is satisfied in S13, the display control section 22 causes the display device 11 to display a preview image (S17), and urges a user to determine whether rotation processing is necessary or not and to input a rotation angle. The rotation processing section 23 then carries out rotation processing with respect to a scanned image so that a direction indicated by an instruction mark selected by the user coincides with the second reference direction after the rotation processing (S19).

Embodiment 3

According to the Embodiment 3, in a case where a difference between the largest reliability value and the second largest reliability value is large, a preview image is not displayed, and rotation processing is automatically carried out, whereas in a case where the difference between the largest reliability value and the second largest reliability value is small, the preview image is displayed. The following description deals with this embodiment in detail.

In a case where a difference between (i) the largest reliability value (reliability value of a direction that is ranked first in the order of largeness of the reliability value) and (ii) the second largest reliability value (reliability value of a direction that is ranked second in the order of largeness of the reliability value) of reliability values of the first through fourth directions of a scanned image 300d is small (see FIG. 12), there is a possibility that the scanned image 300d is an N-up image (multi-shot copy) in which a plurality of document images whose first reference directions are different from one another are shown. Note that the N-up image is image data used in a case where a plurality of document images are printed on a single piece of paper. Further, the first reference direction refers to an upward direction of a document image shown in the scanned image 300d (direction pointing from a lower side of the document image toward an upper side of the document image) as in the Embodiment 1. In a case where the scanned image 300d is an N-up image in which a plurality of document images whose first reference directions are different from one another are shown, there is a possibility that rotation processing that is not intended by a user is automatically carried out if rotation processing is automatically carried out so that a direction having the largest reliability value coincides with the second reference direction. That is, in a case where the user hopes that rotation processing is carried out so that a direction having the second largest reliability value coincides with the second reference direction after the rotation processing, rotation processing that is not intended by a user is carried out if rotation processing is carried out so that a direction having the largest reliability value coincides with the second reference direction. In view of this, in a case where the difference between the largest reliability value and the second largest reliability value is not more than a threshold value, a preview image should be displayed (i) so that the user can check page orientation of the document image and input a command to carry out rotation processing and (ii) so that rotation processing that is not intended by the user is not automatically carried out.

Figure 13:
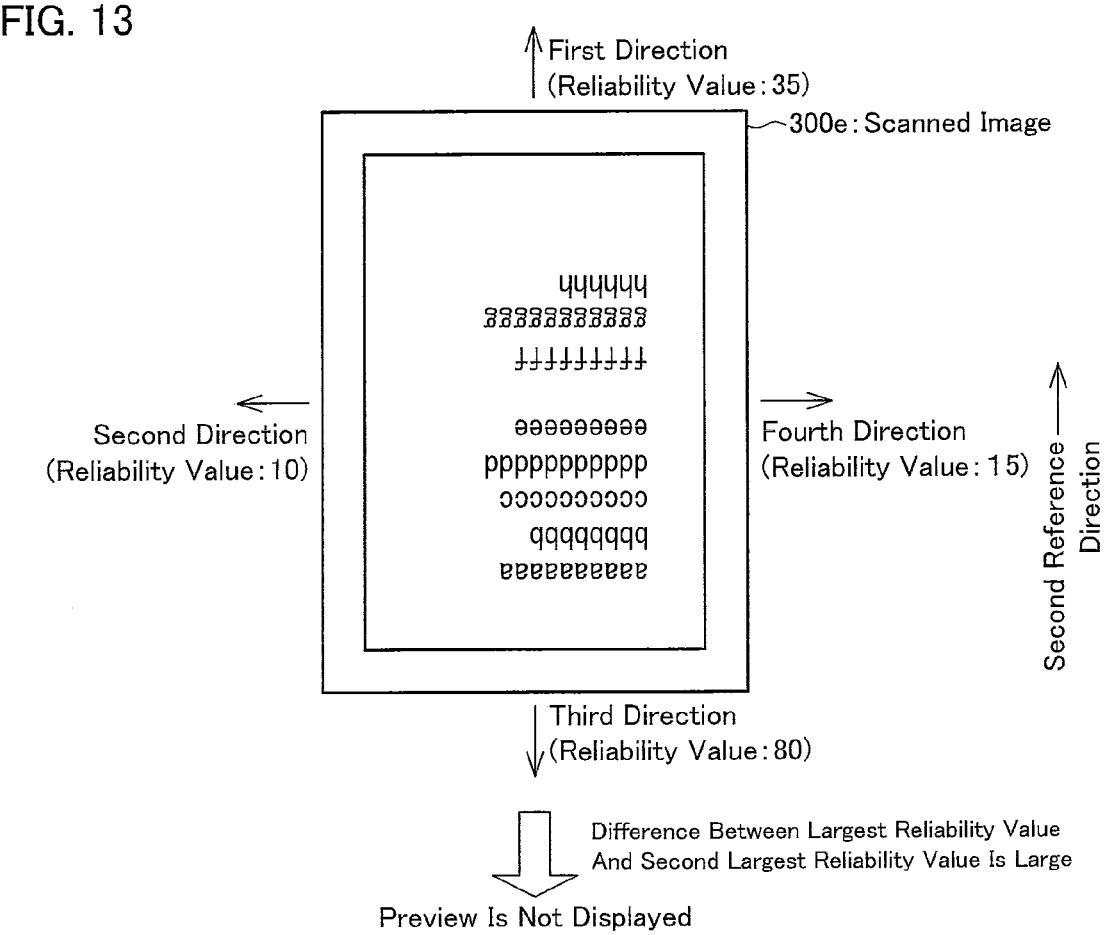
FIG. 13 is a view for explaining processing of not displaying a preview image in a case where a difference between the largest reliability value and the second largest reliability value is larger than a threshold value.

In contrast, in a case where a difference between the largest reliability value and the second largest reliability value is larger than a threshold value (see FIG. 13), a direction having the largest reliability value almost surely coincides with the first reference direction. In this case, the scanned image 300d is highly likely an image showing a single document image. In this case, a preview image is not displayed, and rotation processing is automatically carried out so that the direction having the largest reliability value coincides with the second reference direction after the rotation processing (see FIG. 13). This saves labor and time for the user.

In view of this, according to the present embodiment, in a case where a difference parameter is larger than a threshold value, a preview image is not displayed, and rotation processing is automatically carried out, whereas in a case where the difference parameter is not more than the threshold value, the preview image is displayed. Note that the difference parameter indicates a difference between the largest reliability value of and the second largest reliability value of reliability values determined by the reliability determining section 21. This can (i) prevent rotation processing that is not intended by a user from being carried out and (ii) save labor and time for the user.

Figure 14:
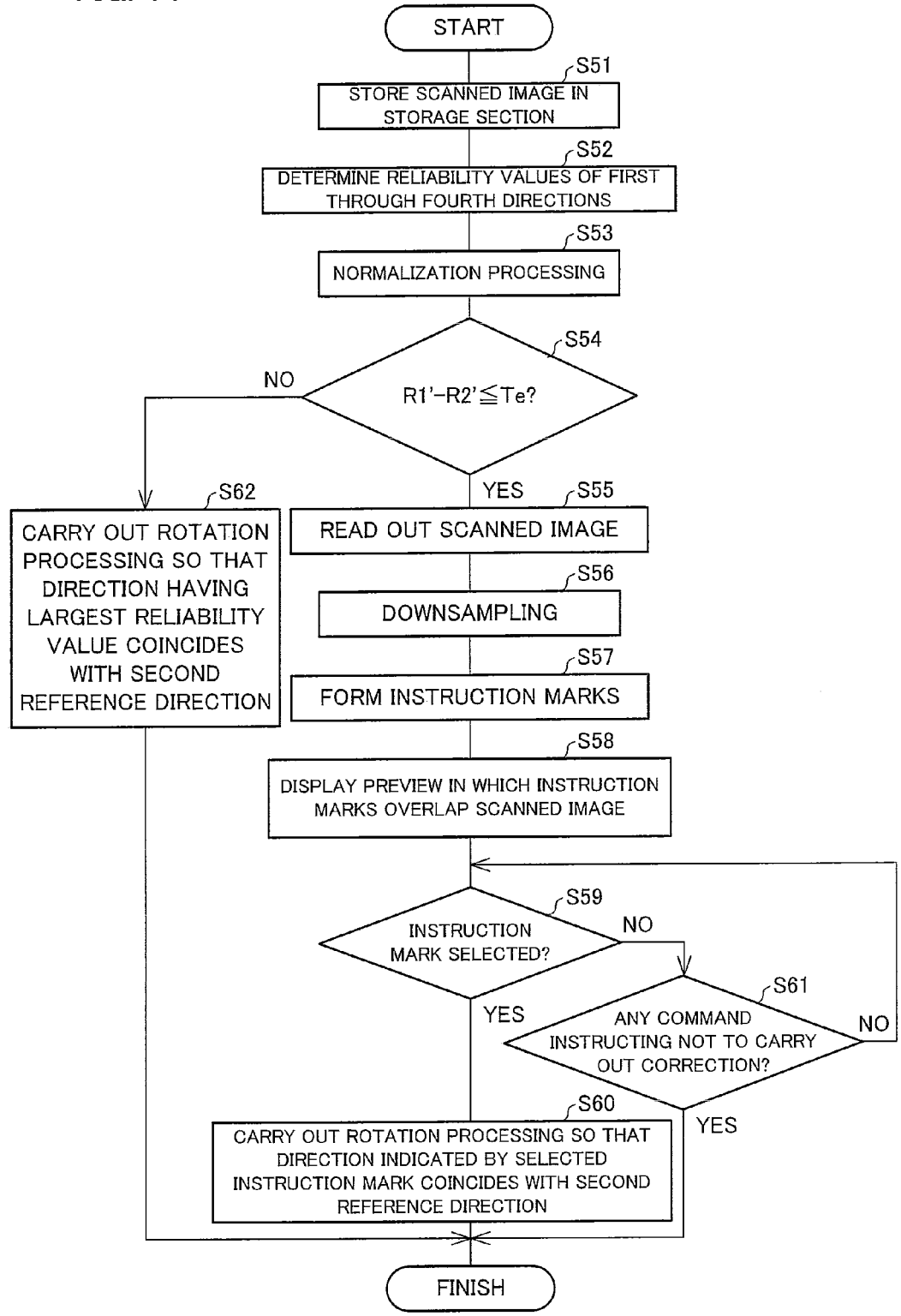
FIG. 14 is a flow chart showing a flow of processing carried out in the Embodiment 3.

FIG. 14 is a flow chart showing a flow of processing carried out in the present embodiment. S51 and S52 of FIG. 14 are similar to S1 and S2 of FIG. 6, respectively, and S55 through S61 of FIG. 14 are identical to S3 through S9 of FIG. 6, respectively. Therefore, S51, S52, and S55 through S61 are not explained here in detail.

In the flow of FIG. 14, after S52, a determining section (not shown) determines, as R1, the largest reliability value and determines, as R2, the second largest reliability value of reliability values of the first through fourth directions, and then normalizes R1 and R2 (S53). Here, the normalized R1 is expressed as R1', and the normalized R2 is expressed as R2'. Note that R1'=R1/R1 is satisfied, and R2'=R2/R1 is satisfied. The determining section judges whether R$1'-$R$2' \leq$Te is satisfied or not (S54). Note that Te is a threshold value, and is set to 0.5, for example.

If it is determined that R$1'-$R$2' \leq$Te is not satisfied in S54, the display control section 22 causes the display device 11 not to display a preview image, and the rotation processing section 23 automatically carries out rotation processing with respect to a scanned image so that a direction having the largest reliability value coincides with the second reference direction (S62). In contrast, if it is determined that R1'−R2'≦Te is satisfied in S54, the display control section 22 causes the display device 11 to display a preview image (S58), and urges a user to determine whether rotation processing is necessary or not and to input a rotation angle. The rotation processing section 23 then carries out rotation processing with respect to the scanned image so that a direction indicated by an instruction mark selected by the user coincides with the second reference direction (S60).

Note that, in the procedure of FIG. 14, R1'−R2' of S54 corresponds to a difference parameter indicating a difference between the largest reliability value and the second largest reliability value. Therefore, according to the procedure of FIG. 14, the following processing can be realized. Specifically, in a case where the difference parameter is larger than a threshold value, a preview image is not displayed and rotation processing is automatically carried out, whereas in a case where the difference parameter is not more than the threshold value, the preview image is displayed. Note that the difference parameter is not limited to R1'−R2', but can be R1−R2.

Embodiment 4

According to the Embodiment 3, in a case where a difference parameter, which indicates a difference between the largest reliability value and the second largest reliability value, is larger than a threshold value, a preview image is not displayed and rotation processing is automatically carried out, whereas in a case where the difference parameter is not more than the threshold value, the preview image is displayed. In the Embodiment 3, R1−R2 or R1'−R2' is the difference parameter. However, the difference parameter is not limited to R1−R2 or R1'−R2', but can be R1/R2, for example. This is because R1/R2 is a value which becomes larger as a difference between the largest reliability value and the second largest reliability value becomes larger, and therefore corresponds to the difference parameter.

Figure 15:
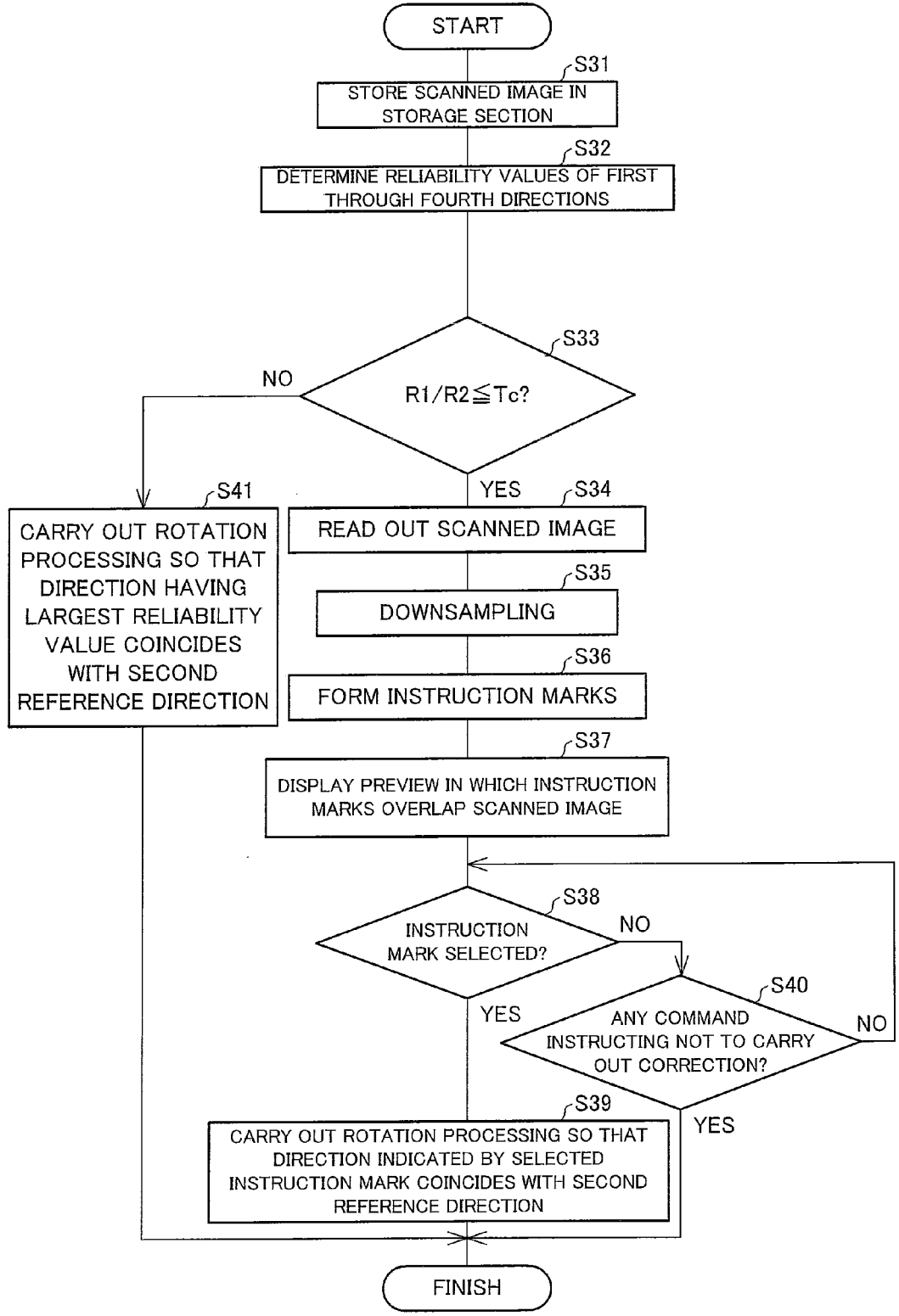
FIG. 15 is a flow chart showing a flow of processing carried out in the Embodiment 4.

The following description deals with a flow of processing carried out in a case where R1/R2 is the difference parameter. FIG. 15 is a flow chart showing a flow of processing carried out in the present embodiment. S31 and S32 of FIG. 15 are similar to S1 and S2 of FIG. 6, respectively, and S34 through S40 of FIG. 15 are identical to S3 through S9 of FIG. 6, respectively. Therefore, S31, S32, and S34 through S40 are not explained here in detail.

In the flow of FIG. 15, after S32, a determining section (not shown) determines, as R1, the largest reliability value and determines, as R2, the second largest reliability value of reliability values of the first through fourth directions, and then judges whether R1/R2≦Tc is satisfied or not (S33). Note that Tc is a threshold value, and is set to 2, for example.

If it is determined that R1/R2≦Tc is not satisfied in S33, the display control section 22 causes the display device 11 not to display a preview image, and the rotation processing section 23 automatically carries out rotation processing with respect to a scanned image so that a direction having the largest reliability value coincides with the second reference direction (S41). In contrast, if it is determined that R1/R2≦Tc is satisfied in S33, the display control section 22 causes the display device 11 to display a preview image (S37), and urges a user to determine whether rotation processing is necessary or not and to input a rotation angle. The rotation processing section 23 then carries out rotation processing with respect to the scanned image so that a direction indicated by an instruction mark selected by the user coincides with the second reference direction (S39).

Embodiment 5

According to the procedure shown in FIG. 11, a preview can be displayed as for a scanned image in which a document image has a small number of characters, but a preview cannot be displayed as for an N-up image in which a plurality of document images whose first reference directions are different from one another are shown. In contrast, according to the procedure shown in FIG. 14 or FIG. 15, a preview can be displayed as for an N-up image in which a plurality of document images whose first reference directions are different from one another are shown, but a preview cannot be displayed as for a scanned image in which a document image has a small number of characters.

In view of this, the procedure of FIG. 11 and the procedure of FIG. 14 are combined, or the procedure of FIG. 11 and the procedure of FIG. 15 are combined. This makes it possible to display preview of both of (i) a scanned image in which a document image has a small number of characters and (ii) an N-up image in which a plurality of document images whose first reference directions are different from one another are shown.

Figure 16:
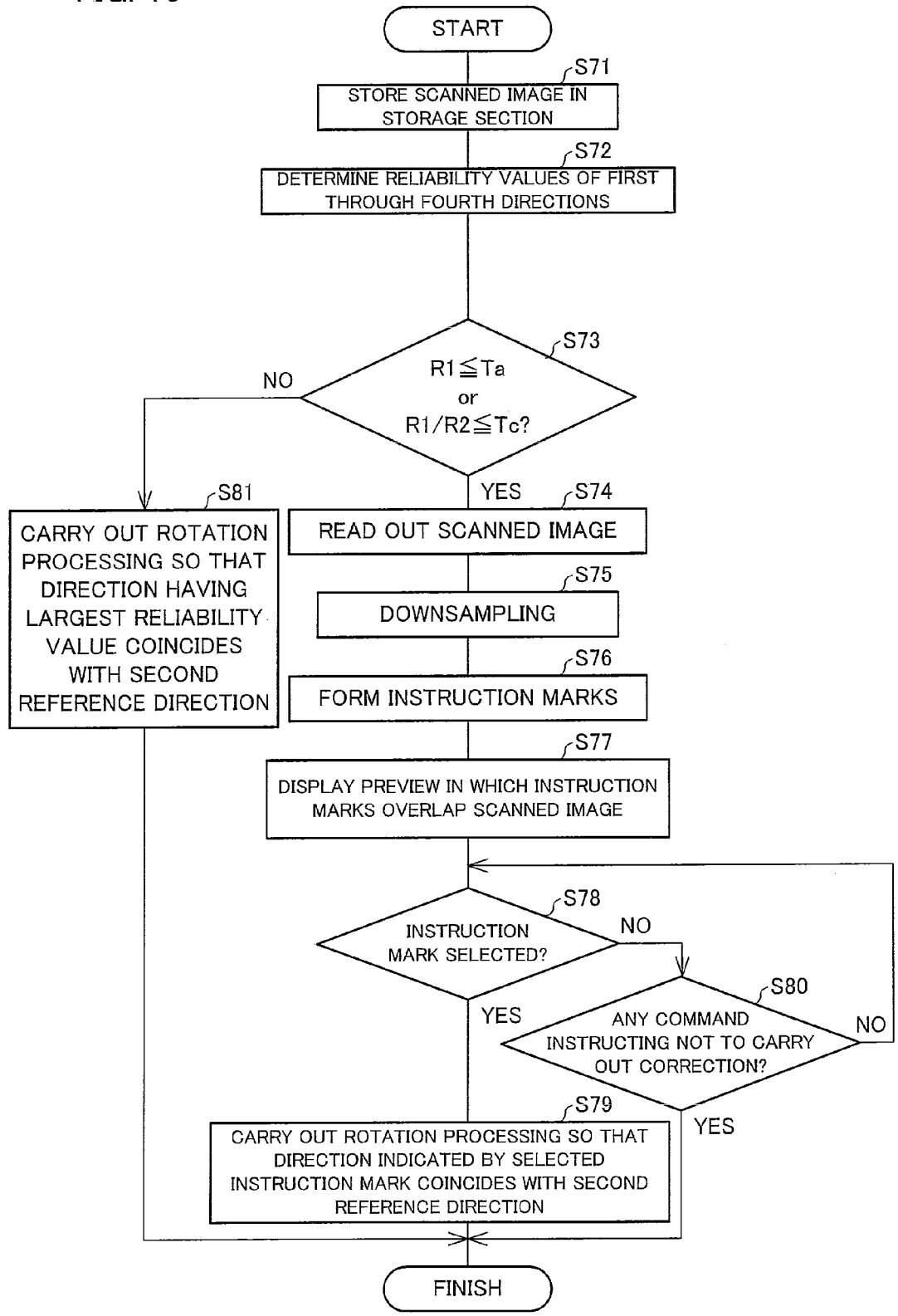
FIG. 16 is a flow chart showing a flow of processing carried out in the Embodiment 5.

The following description deals with processing carried out in a case where the procedure of FIG. 11 and the procedure of FIG. 15 are combined. FIG. 16 is a flow chart showing a flow of processing carried out in a case where the procedure of FIG. 11 and the procedure of FIG. 15 are combined. S71 and S72 of FIG. 16 are similar to S1 and S2 of FIG. 6, respectively, and S74 through S80 of FIG. 16 are identical to S3 through S9 of FIG. 6, respectively. Therefore, S71, S72, and S74 through S80 are not explained here in detail.

In the flow of FIG. 16, after S72, a determining section (not shown) determines, as R1, the largest reliability value and determines, as R2, the second largest reliability value of reliability values of the first through fourth directions, and then judges whether R1≦Ta or R1/R2≦Tc is satisfied or not (S73).

If it is determined that both of R1≦Ta and R1/R2≦Tc are not satisfied in S73, the display control section 22 causes the display device 11 not to display a preview image, and the rotation processing section 23 automatically carries out rotation processing with respect to a scanned image so that a direction having the largest reliability value coincides with the second reference direction (S81). In contrast, if it is determined that R1≦Ta or R1/R2≦Tc is satisfied in S73, the display control section 22 causes the display device 11 to display a preview image (S77), and urges a user to determine whether rotation processing is necessary or not and to input a rotation angle. The rotation processing section 23 then carries out rotation processing with respect to the scanned image so that a direction indicated by an instruction mark selected by the user coincides with the second reference direction (S79).

Embodiment 6

According to the Embodiment 6, a preview image which has been subjected to provisional rotation processing is displayed on the display device 11, the provisional rotation processing being carried out so that a direction having the largest reliability value of the first through fourth directions coincides with a second reference direction. Note that the second reference direction is an upward direction of a scanned image, and is an upward direction of a display screen.

According to this embodiment, before actual rotation processing is carried out, a user can check a preview image so as to confirm how a scanned image 300 that has been subjected to the actual rotation processing looks like, the actual rotation processing being carried out so that a direction having the largest reliability value coincides with the second reference direction.

Figure 17:
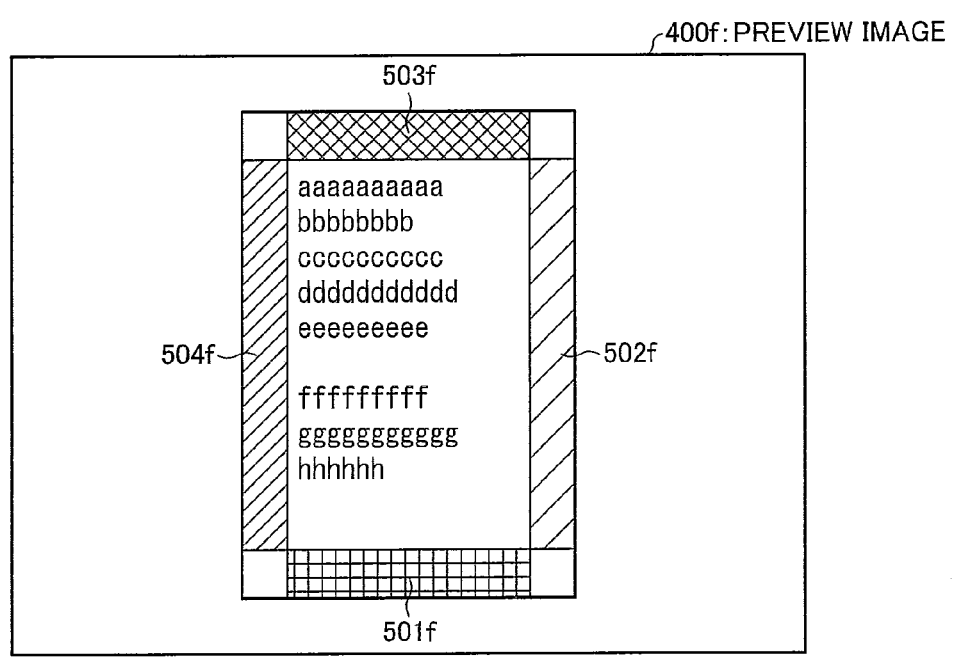
FIG. 17 is a view showing a preview image that has been subjected to provisional rotation processing.

For example, FIG. 17 shows a preview image 400f which corresponds to the scanned image 300 shown in FIG. 2(a). The preview image 400f has been subjected to provisional rotation processing at a rotation angle of 180° so that a first reference direction (upward direction of a document image) of the document image shown in the preview image 400f coincides with a second reference direction (upward direction of a display screen). A user can check the preview image 400f so as to confirm how an image that has been subjected to rotation processing so that a direction having the largest reliability value coincides with the second reference direction looks like.

Figure 18:
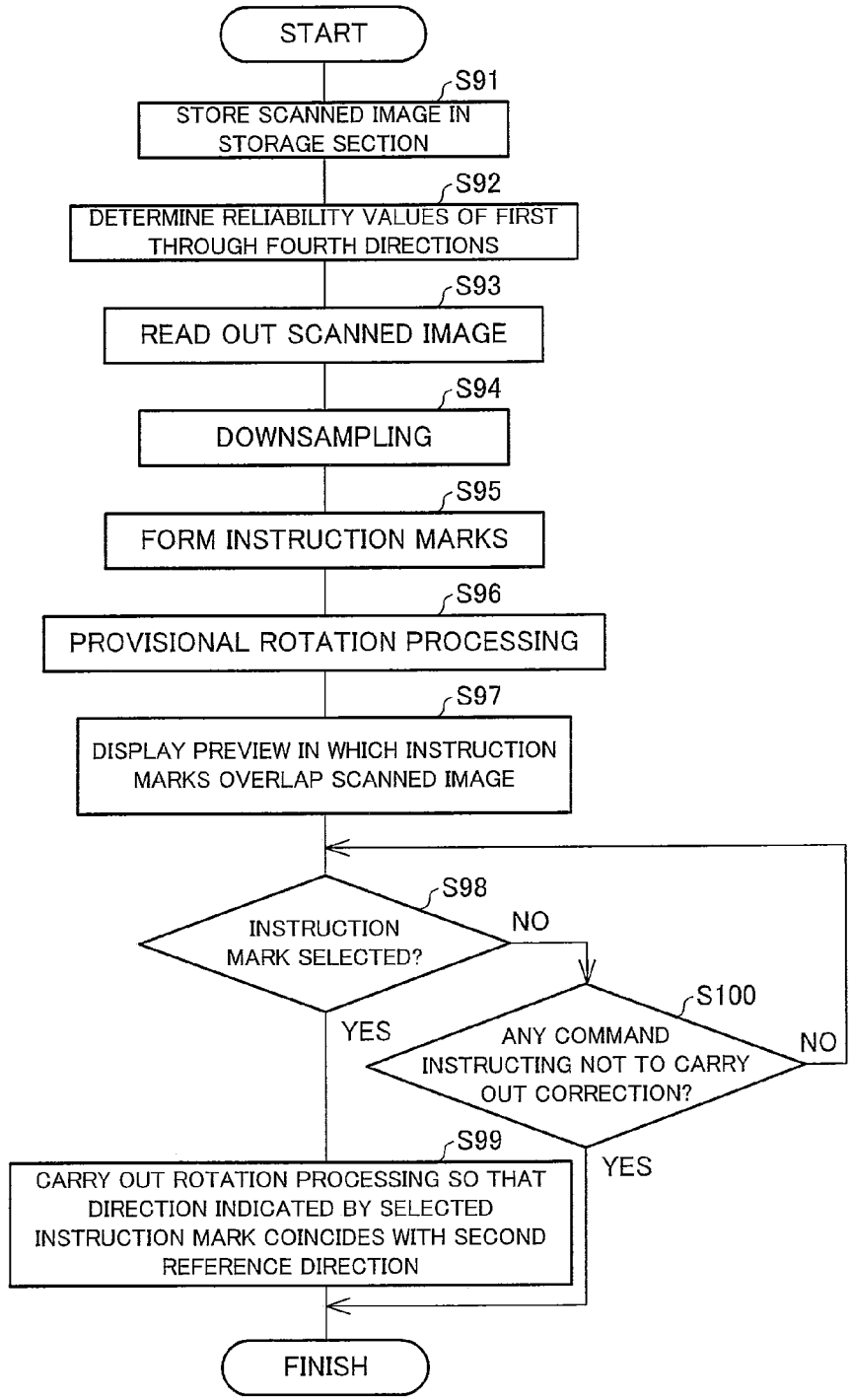
FIG. 18 is a flow chart showing a flow of processing carried out in the Embodiment 6.

FIG. 18 is a flow chart showing a flow of processing carried out in the present embodiment. S91 through S95 of FIG. 18 are similar to S1 through S5 of FIG. 6, respectively, and S97 through S100 of FIG. 18 are identical to S6 through S9 of FIG. 6, respectively. Therefore, S91 through S95 and S97 through S100 are not explained here in detail.

In the flow of FIG. 18, after S95, the display control section 22 carries out provisional rotation processing with respect to instruction marks of the first through fourth directions and a scanned image so that a direction having the largest reliability value of the first through fourth directions coincides with the second reference direction (S96), the instruction marks being formed in S95 and the scanned image having been subjected to downsampling in S94. The display control section 22 causes the display device 11 to display a preview image in which the instruction marks and the scanned image which have been subjected to the provisional rotation processing overlap each other (S97). S98 through S100 are carried out in a similar manner to S6 through S9 of the Embodiment 1.

Note that, in the Embodiments 1 through 6 described above, the control section 13 detects a document size and a document orientation (A4 placed horizontally, A4 placed vertically, or a document in which a variety of document sizes exist (if an ADF (Auto Document Feeder) is used), for example), and if it is determined that the document size or the document orientation is correct, it is possible to finish the processing without a preview image being displayed on the display device 11. The reason is that, for example, there may be a case where a vertically-written A4 document includes a horizontally-written A4 chart or diagram, and in such a case, the rotation processing is unnecessary.

The detection of the document size is carried out as described below. In a case where a document is placed and read on a scanner platen, the following method may be adopted, that is, a method in which a photoelectric conversion element (such as a photo transistor) arranged in the image input apparatus detects a document size in a main scanning direction and a sub scanning direction, for example. Alternatively, a user may input a selection via an operation panel so as to determine a document size. Further, in a case where a document is read from the ADF, the number of pixels (an image region) in the main scanning direction and the sub scanning direction of a scanned document image is detected based on output from an image sensor, such as a CCD (Charge Coupled Device) included in the image input apparatus, and a document size is then detected based on the number of pixels.

Further, in the Embodiments 1 through 6 described above, the first reference direction is an upward direction of a document image 301. However, the first reference direction can be a downward direction of the document image 301 (direction pointing from an upper side of the document image 301 toward a lower side of the document image 301). Note, however, that in a case where the downward direction of the document image 301 is set as the first reference direction, the second reference direction is a downward direction of a scanned image 300 (direction pointing from an upper side of the scanned image 300 toward a lower side of the scanned image 300). Further, also in this case, the first direction is set as a direction which coincides with the second reference direction before rotation processing is carried out.

[Image Forming Apparatus]

Figure 19:
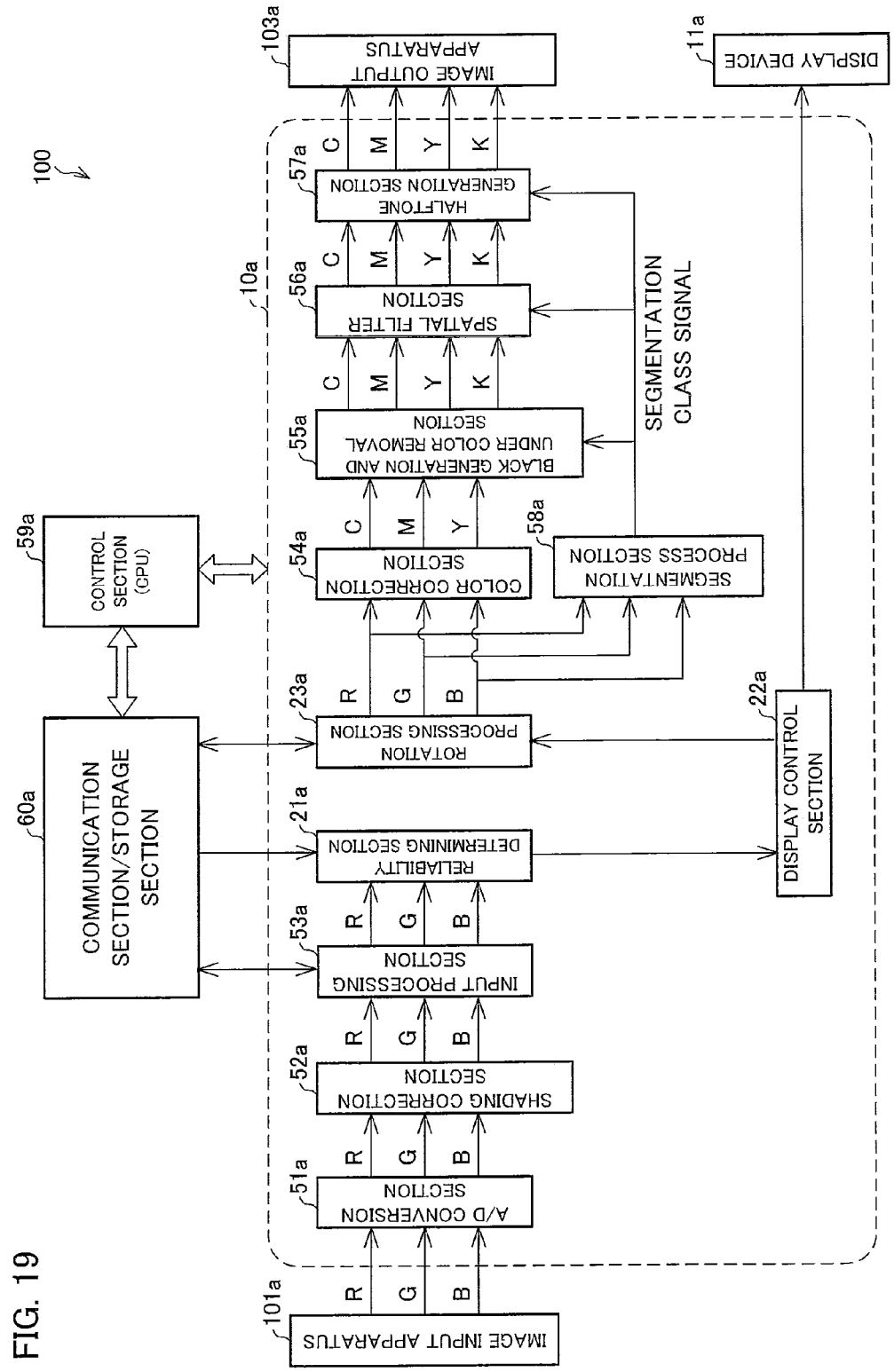
FIG. 19 is a block diagram showing one embodiment of an image forming apparatus of the present invention.

The following description deals with an image forming apparatus 100 including an image processing apparatus 10a which is a modification of the image processing apparatus 10 shown in FIG. 1. FIG. 19 is a block diagram showing the image forming apparatus (a digital copying machine or a multifunction printer) 100. The multifunction printer has a function of a copying machine, a function of a printer, a function of fax transmission, and a function of scanning to e-mail, for example.

An image input apparatus 101a is constituted by a CCD (Charge Coupled Device) line sensor, and converts light reflected from a document into an electric signal indicating each color component of R, G, and B (R: red, G: green, B: blue) of the light. The color image signal (RGB analogue signals) generated by the image input apparatus 101a is converted into a digital signal in an A/D (analogue-to-digital) conversion section 51a, and then various distortion generated in an illumination system, an image focusing system, and an image sensing system of the image input apparatus 101a is removed in a shading correction section 52a. After that, processing, such as gamma correction processing, is carried out with respect to each of the RGB signals in an input processing section 53a.

The data outputted from the input processing section 53a is received by a communication section/storage section 60a. A reliability determining section 21a determines reliability values of first through fourth directions of a scanned image 300 based on the image data (data of the scanned image) stored in the communication section/storage section 60a. A display control section 22a obtains data of the scanned image 300 from the reliability determining section 21a, and creates, based on the data of the scanned image 300 and the reliability values, a preview image 400 in which instruction marks 501 through 503 overlap the scanned image 300. The display control section 22a then causes a display device 11a to display the preview image 400. Note that the display device 11a is an apparatus, which displays an image and which is provided on an operation panel of the image forming apparatus 100, such as liquid crystal display.

If a user selects one of the instruction marks 501 through 504, the display control section 22a transmits information of the instruction mark selected by the user to a rotation processing section 23a. The rotation processing section 23a reads out the data of the scanned image 300 stored in the communication section/storage section 60a, sets a rotation angle based on the selected instruction mark, and carries out rotation processing with respect to the scanned image 300. Further, the rotation processing section 23a overwrites scanned image 300 stored in the communication section/storage section 60a with the scanned image 300 (RGB signals) that has been subjected to the rotation processing, and transmits the scanned image 300 that has been subjected to the rotation processing to a color correction section 54a.

The color correction section 54a converts the RGB signals transmitted from the rotation processing section 23a into CMY (C: cyan, M: magenta, Y: yellow) signals (which are complementary colors of the RGB signals), and carries out processing of improving color reproducibility. In a black generation and under color removal section 55a, the CYM signals are converted into four CMYK (K: black) signals.

With respect to the CMYK signals, enhancement processing, smoothing processing, and the like are carried out in a spatial filter section 56a, and then, tone reproduction processing for outputting an image is carried out in a halftone generation section 57a.

Meanwhile, in a segmentation process section 58a, it is determined which region (a black text, a color text, a halftone, or a photograph (a continuous tone image region), for example) each pixel of the image data belongs to. The segmentation process section 58a outputs segmentation class signal indicating a determined result. The segmentation class signal outputted from the segmentation process section 58a is supplied to the black generation and under color removal section 55a, the spatial filter section 56a, and the halftone generation section 57a. In the black generation and under color removal section 55a, the spatial filter section 56a, and the halftone generation section 57a, the processing is appropriately switched over in accordance with various regions.

The halftone generation section 57a outputs the CMYK signals to an image output apparatus 103a, and then an output image is formed. The image output apparatus 103a is an apparatus for printing an image for an electrophotographic printer or an ink jet printer, for example.

According to the above arrangement, the reliability determining section 21a obtains image data (data of a scanned image) from the communication section/storage section 60a. However, the reliability determining section 21a can obtain the image data directly from the input processing section 53a. Further, according to the above arrangement, data of a scanned image that has been subjected to rotation processing in the rotation processing section 23a can be converted into, for example, a PDF file format, and can be transferred to, via a network or a communication line, an external connection apparatus or a communication line.

Further, according to the above arrangement, data of the scanned image that has been subjected to rotation processing in the rotation processing section 23a can be managed as filing data. In this case, the data of the scanned image is stored in such a manner that the data is encoded into a JPEG code based on a JPEG compressing algorithm, for example. Then, in a case where a copy output operation or a print output operation is inputted, the JPEG code is extracted from a hard disc. After that, the JPEG code is received by a JPEG decoding section, and is decoded so as to be converted into RGB data.

Meanwhile, in an image transmission operation, the JPEG code is extracted from the hard disc, and then is transferred to, via a network or a communication line, an external connection apparatus or a communication line. A control section 59a manages the filing data, and controls operation of transferring data.

[Image Reading Apparatus]

Figure 20:
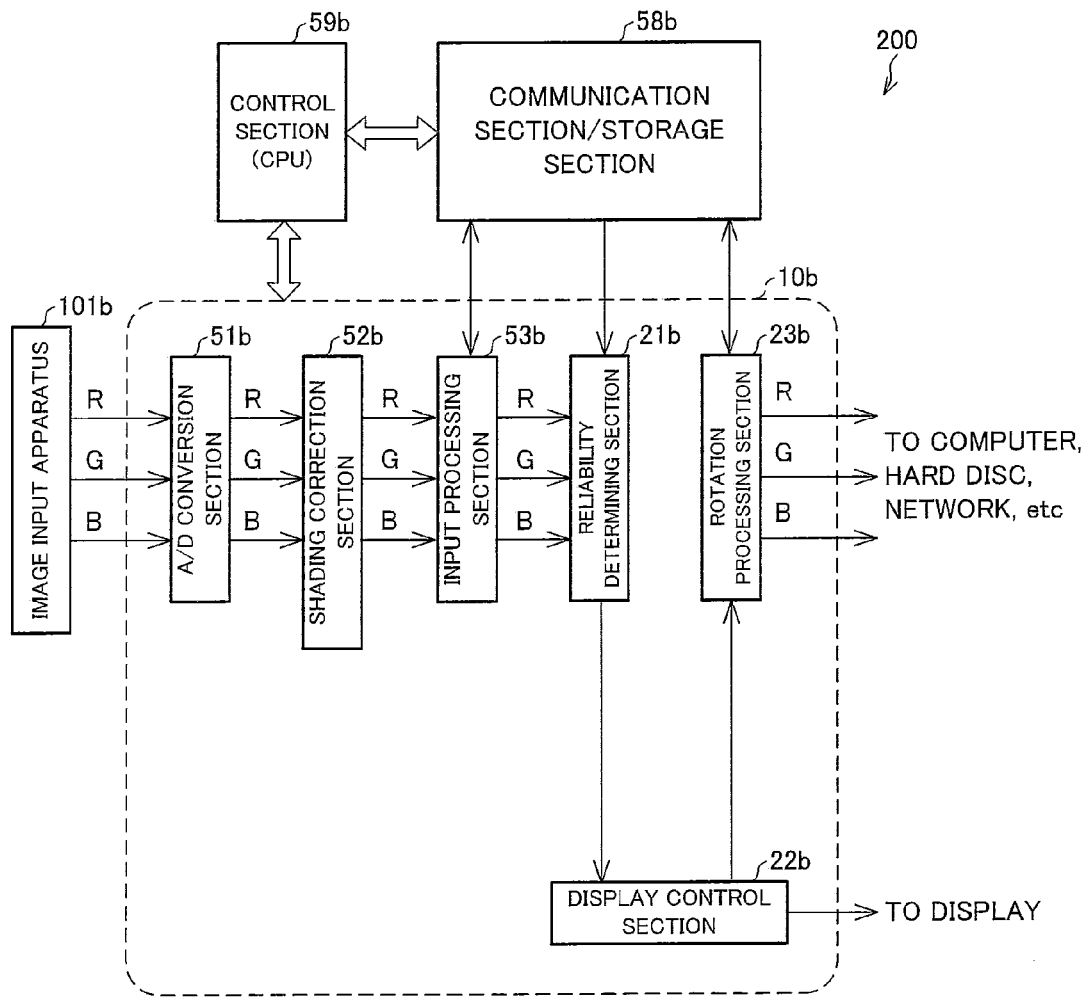
FIG. 20 is a block diagram showing one embodiment of an image reading apparatus of the present invention.

The following description deals with an image reading apparatus 200 including an image processing apparatuses 10b which is a modification of the image processing apparatus 10 shown in FIG. 1. FIG. 20 is a view showing an arrangement of the image processing apparatus 10b used in a color image reading apparatus (scanner) of the present embodiment.

The image reading apparatus 200 includes an image input apparatus 101b, and the image processing apparatus 10b, a control section 59b, a communication section/storage section 58b. The image processing apparatus 10b includes an A/D conversion section 51b, a shading correction section 52b, an input processing section 53b, a reliability determining section 21b, a rotation processing section 23b, and a display control section 22b.

The processing carried out in the image input apparatus 101b, the A/D conversion section 51b, the shading correction section 52b, the input processing section 53b, the reliability determining section 21b, the rotation processing section 23b, and the display control section 22b is the same as the processing carried out in the image input apparatus 101a, the A/D conversion section 51a, the shading correction section 52a, the input processing section 53a, the reliability determining section 21a, the rotation processing section 23a, and the display control section 22a shown in FIG. 19.

After being processed in various processing sections of the image processing apparatus 10b, the RGB image signals are outputted to a computer, a hard disk, or a network, for example. Further, a display control section 22b creates a preview image 400 in which instruction marks 501 through 504 overlap a scanned image, and causes a display device to display the preview image 400. Note that the display device may be a display panel provided separately from the image reading apparatus 200 or may be a display panel provided in the image reading apparatus 200.

[Image Input Apparatus]

The following description deals with said image input apparatuses 101a and 101b. Since the image input apparatuses 101a and 101b have the same arrangement, hereinafter, the image input apparatuses 101a and 101b are referred to as "image input apparatus 101".

Figure 21:
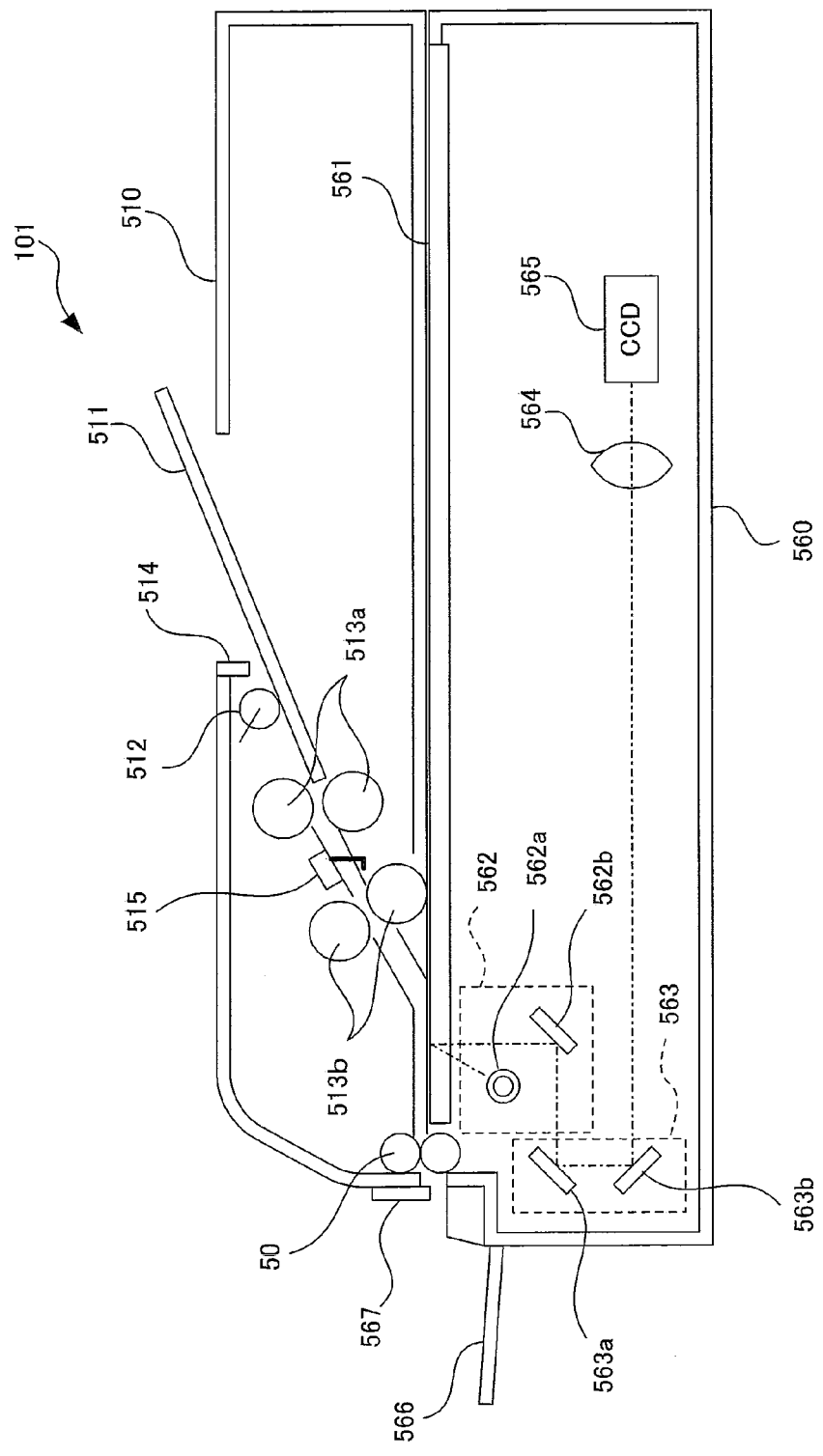
FIG. 21 is a view showing an arrangement of an image input apparatus shown in FIGS. 19 and 20.

FIG. 21 is a view schematically illustrating an arrangement of the image input apparatus 101. The image input apparatus 101 includes: a document feeding section provided in an upper housing 510; a scanner section provided in a lower housing 560; and the like. The upper housing 510 includes: a document set sensor 514 for detecting a document placed on a document tray 511; a pick-up roller 512 for conveying documents one by one; conveyance rollers 513a and 513b for conveying a document so that an image of the document is read; a document output roller 50 for outputting a document; a document output tray 566 on which an outputted document is placed; a document output sensor 567 for detecting an outputted document; and the like. The conveyance roller 513b functions as an alignment roller for adjusting an orientation of a sheet. A driving shaft of the conveyance roller 513b includes an electromagnetic clutch (not illustrated). A control circuit (not illustrated) controls the electromagnetic clutch so as to control transfer of driving force from a drive motor (not illustrated) to the conveyance roller 513b. In a case where no document is provided, the conveyance roller 513b is not in operation. If a front end of a document touches a feeding timing sensor 515, and a predetermined signal is transferred from the sensor to the control circuit, the conveyance roller 513b starts its rotation operation so as to transport the document in a direction from the document tray 511 to the output tray 566. The conveyance roller 513b is set such that, when (i) a document is transported from an upstream section, and a front end of the document is pressed against a nip section of the conveyance roller 513b that is not in operation, and (ii) the document is bent, the conveyance roller 513b starts its rotation operation. This corrects a position of the document in such a manner that the nip section of the conveyance roller 513b causes the front end of the document to be perpendicular to a conveyance direction.

The lower housing 560 includes: scan units 562 and 563 which reciprocate along a lower surface of a scanner platen

561; an imaging lens 564; a CCD line sensor 565 which is a photoelectric conversion element; a paper output tray 566; and the like.

The scan unit 562 includes: a light source 562*a* (a halogen lamp, for example) for irradiating light toward a document conveyed from the document tray 511, or a document placed on the scanner platen 561; a mirror 562*b* for leading light reflected from the document to a predetermined light path; and the like. Further, the scan unit 563 includes mirrors 562*a* and 563*b* for leading, toward the CCD line sensor 565, the light that was reflected from the document and then lead by the mirror 562*b* to the predetermined light path.

The imaging lens 564 leads the reflected light from the scan unit 563 and forms an optical image on a predetermined position on the CCD line sensor 565. The CCD line sensor 565 carries out the photoelectric conversion with respect to the formed light image, and outputs an electric signal. In other words, the CCD line sensor 565 outputs, to the image processing apparatuses 10*a* and 10*b*, data that has been color-separated into each of color components R (red), G (green), and B (blue) in accordance with a color image read from the document (a surface of the document, for example).

[Program]

The present embodiment can be realized by storing, in a computer-readable recording medium that stores a program code (an execution format program, an intermediate code program, a source program) to be carried out by a computer, a program indicating the processing carried out by the reliability determining section 21, the display control section 22, and the rotation processing section 23 shown in FIG. 1. As a result, it becomes possible to provide a portable recording medium in which the program for carrying out the processing that is carried out by the reliability determining section 21, the display control section 22, and the rotation processing section 23.

In the present embodiment, the recording medium may be a program medium such as a memory (not illustrated) (e.g. ROM) used in processing carried out by a microcomputer, or such a program medium that (i) a program reading apparatus is provided an external storage apparatus (not illustrated), and (ii) the recording medium is inserted into the program reading apparatus so that the program is read. In any cases, it is possible to have an arrangement in which a microprocessor accesses the program code so as to perform the program code. Alternatively, in any cases, it is possible to have an arrangement in which (i) the program code is read out and downloaded to a program storage area (not illustrated) of a microcomputer, and (ii) the program code is performed. The program for downloading the program code is stored in a main apparatus in advance.

Here, the program medium may be a recording medium that is arranged separable from the main apparatus. The program medium may be a medium in which a program code is supported and fixed, such as: a tape (such as a magnetic tape or a cassette); a disc such as a magnetic disk (a floppy (registered trademark) disk, or a hard disk, for example) or an optical disk (a CD-ROM, an MO, an MD, or a DVD, for example); a card (such as an IC card (including a memory card) or an optical card); and a semiconductor memory (such as a mask ROM, an EPROM (Erasable Programmable Read Only Memory), an EEPROM (Electrically Erasable Programmable Read Only Memory), or a flash ROM).

Further, in the present embodiment, a system is arranged such that (i) the system can be connected to a communication network including the Internet, and (ii) the program code may be supported but not fixed in a medium (the program code may be downloaded from a communication network, for example). In the case where the program code is downloaded from a communication network, the program for downloading the program code may be stored in the main apparatus in advance, or may be installed from another recording medium to the main apparatus. Further, the present invention can be realized in a form of a computer data signal that is realized by electronic transmission of the program code, and embedded in a carrier wave. The program stored in the recording medium is read out by a program reading apparatus included in a digital color image forming apparatus or a computer system, so that the reliability determining section 21, the display control section 22, and the rotation processing section 23 can be realized.

A computer system includes: an image input apparatus (such as a flat head scanner, a film scanner, or a digital camera); a computer in which a predetermined program is loaded so as to carry out various processing (said image processing method, for example); an image display device (such as a CRT display or a liquid crystal display) for displaying a result of processing of a computer; and a printer for outputting the result of the processing of the computer on paper or the like. The computer system further includes communication means (such as a network card or a modem) for connecting the computer system to a server or the like via a network.

In order to attain the above object, the present invention provides an image processing apparatus for processing a scanned image which is read out from a document and in which a document image is shown, includes: a reliability determining section which determines reliability of coincidences of respective first through fourth directions with a first reference direction, the first through fourth directions being directions pointing from a center of the document image toward respective four sides of the document image and being perpendicular to the respective four sides of the document image, the first reference direction being an upward direction of or a downward direction of the document image; and a display control section which creates markers indicating the respective first through fourth directions, and which causes a display device to display a preview image in which the markers and the scanned image overlap each other, the display control section causing the markers to be displayed in respective different ways in accordance with the reliability.

According to the arrangement of the present invention, markers indicating respective first through fourth directions of a scanned image are displayed in different ways from one another in accordance with reliability of coincidences of the respective first through fourth directions with a first reference direction. This makes it easy for a user to recognize a page orientation of a document image regardless of the size of the scanned image.

Note that in a case where a user who recognized page orientation of a document image judges that it is necessary to correct the orientation of the document image, the correction of the orientation is carried out by rotation processing (rotation realized by image processing) or rescanning (rescanning a document after a direction in which the document is placed is changed).

The image processing apparatus of the present invention may be arranged such that the display control section causes the markers to be displayed in the respective different ways in an order of their reliability. Further, the image processing apparatus of the present invention may be arranged such that the display control section causes the markers to be displayed in the respective different ways by changing respective densities or colors, or may be arranged such that the display control section causes the markers to be displayed in the respective different ways by changing respective sizes.

Further, the image processing apparatus of the present invention may be arranged such that in a case where the first reference direction is the upward direction of the document image, an upward direction of the scanned image is a second reference direction, and in a case where the first reference direction is the downward direction of the document image, a downward direction of the scanned image is the second reference direction, and said apparatus further including: a rotation processing section which, in a case where a user selects one of the markers indicating the respective first through fourth directions, carries out rotation processing with respect to the scanned image so that a direction indicated by said one of the markers coincides with the second reference direction.

According to the arrangement, a user just needs to select one of the markers in order to carry out rotation processing with respect to a scanned image so that a direction indicated by the marker selected by the user coincides with the second reference direction. This makes it unnecessary for the user to input a rotation angle and the like, thereby allowing an increase in the level of convenience of operation.

In addition to the arrangement, the image processing apparatus of the present invention may be arranged such that the reliability determining section outputs reliability values of the respective first through fourth directions, the reliability values being respective values indicating the reliability and becoming larger as the reliability becomes higher, said apparatus further comprising; a determining section which determines whether a largest reliability value of the reliability values outputted by the reliability determining section is not more than a threshold value or not, wherein: in a case where the determining section determines that the largest reliability value is not more than the threshold value, the display control section causes the display device to display the preview image, and in a case where the determining section determines that the largest reliability value is larger than the threshold value, the display control section causes the display device not to display the preview image, and the rotation processing section carries out rotation processing with respect to the scanned image so that a direction corresponding to the largest reliability value coincides with the second reference direction.

According to the arrangement, in a case where the largest reliability value of reliability values of the first through fourth directions is larger than a threshold value, a direction corresponding to the largest reliability value almost surely coincides with the first reference direction, and a preview image is therefore not displayed, and rotation processing is automatically carried out so that the direction having the largest reliability value coincides with the second reference direction. This saves labor and time for a user. In contrast, in a case where the largest reliability value is not more than a threshold value, a direction corresponding to the largest reliability value highly likely coincides with the first reference direction, but there is a little possibility that the direction corresponding to the largest reliability value does not coincide with the first reference direction. Therefore, a preview image is displayed so that a user judges orientation of the document image and inputs a command to carry out rotation processing. This can prevent incorrect rotation processing from being automatically carried out, and can save labor and time for the user.

Further, in addition to the arrangement, the image processing apparatus of the present invention may be arranged such that the reliability determining section outputs reliability values of the respective first through fourth directions, the reliability values being respective values indicating the reliability and becoming larger as the reliability becomes higher, said apparatus further including: a determining section which determines whether a difference parameter is not more than a threshold value or not, the difference parameter indicating a difference between a largest reliability value of and a second largest reliability value of the reliability values outputted by the reliability determining section, in a case where the determining section determines that the difference parameter is not more than the threshold value, the display control section causes the display device to display the preview image, and in a case where the determining section determines that the difference parameter is larger than the threshold value, the display control section causes the display device not to display the preview image, and the rotation processing section carries out rotation processing with respect to the scanned image so that a direction corresponding to the largest reliability value coincides with the second reference direction.

According to the arrangement, in a case where a difference between the largest reliability value and the second largest reliability value of reliability values of the first through fourth directions is larger than a threshold value, a direction having the largest reliability value almost surely coincides with the first reference direction, and a preview image is therefore not displayed, and rotation processing is automatically carried out so that the direction having the largest reliability value coincides with the second reference direction. This saves labor and time for the user. In contrast, in a case where a difference between the largest reliability value and the second largest reliability value of reliability values of the first through fourth directions of a scanned image is not more than the threshold value, there is a possibility that the scanned image is an N-up image in which a plurality of documents having different first reference directions are shown. In this case, there is a possibility that rotation processing that is not intended by a user is automatically carried out if rotation processing is automatically carried out so that a direction having the largest reliability value coincides with the second reference direction (that is, in a case where the user hopes that rotation processing is carried out so that a direction having the second largest reliability value coincides with the second reference direction, rotation processing that is not intended by a user is carried out if rotation processing is carried out so that a direction having the largest reliability value coincides with the second reference direction). In view of this, in a case where the difference between the largest reliability value and the second largest reliability value is not more than the threshold value, a preview image is displayed so that (i) the user can judge orientation of the document image and input a command to carry out rotation processing. This can prevent rotation processing that is not intended by the user from being automatically carried out, and can save labor and time for the user.

The image processing apparatus of the present invention may be provided in an image forming apparatus or may be provided in an image reading apparatus. Further, the present invention provides a method for controlling an image processing apparatus for controlling an image forming apparatus which is read out from a document and in which a document image is shown, including the steps of: (a) determining reliability of coincidences of respective first through fourth directions with a first reference direction, the first through fourth directions being a direction pointing from a center of the document image toward respective four sides of the document image and being perpendicular to the respective four sides of the document image, the first reference direction being an upward direction of or a downward direction of the document image; and (b) creating markers indicating the respective first through fourth directions, and causing a display device to display a preview image in which the markers and the scanned image overlap each other, in the step (b), the markers being caused to be displayed in respective different ways in accordance with the reliability.

Further, the image processing apparatus of the present invention may be realized by a computer. In this case, the present invention includes a control program for causing a computer to function as each section of the image processing apparatus, and a computer-readable recording medium in which the control program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below. Further, values that are not described in this specification are included in the present invention, provided that such values do not exceed a reasonable range that does not contradict the purpose of the present invention.

INDUSTRIAL APPLICABILITY

An image processing apparatus of the present invention is suitably applicable to an apparatus for processing image data read from a document. Further, the image processing apparatus can be applied to a multifunction printer, a copying machine, a scanner device, a facsimile apparatus, and a terminal device.

The invention claimed is:

1. An image processing apparatus for processing a scanned image which is read out from a document and in which a document image is shown, the apparatus comprising at least a processor that includes:
    a reliability determining section configured to determine from the scanned image reliability of coincidences of respective first through fourth directions with a first reference direction, the first through fourth directions being directions pointing from a center of the document image toward respective four sides of the document image and being perpendicular to the respective four sides of the document image, the first reference direction being an upward direction of or a downward direction of the document image; and
    a display control section configured to create markers indicating the respective first through fourth directions, and configured to cause a display device to display a preview image in which the markers and the scanned image overlap each other,
    the display control section causing the markers to be displayed in respective different ways in accordance with the reliability.

2. The image processing apparatus according to claim 1, wherein
    the display control section causes the markers to be displayed in the respective different ways in an order of their reliability.

3. The image processing apparatus according to claim 1, wherein:
    in a case where the first reference direction is the upward direction of the document image, an upward direction of the scanned image is a second reference direction, and
    in a case where the first reference direction is the downward direction of the document image, a downward direction of the scanned image is the second reference direction, and said apparatus further comprising:
    a rotation processing section which, in a case where a user selects one of the markers indicating the respective first through fourth directions, is configured to carry out rotation processing with respect to the scanned image so that a direction indicated by said one of the markers coincides with the second reference direction.

4. The image processing apparatus according to claim 1, wherein the display control section causes the markers to be displayed in the respective different ways by changing respective densities or colors.

5. The image processing apparatus according to claim 1, wherein
    the display control section is configured to cause the markers to be displayed in the respective different ways by changing respective sizes.

6. The image processing apparatus according to claim 3, wherein:
    the reliability determining section is configured to output reliability values of the respective first through fourth directions, the reliability values being respective values indicating the reliability and becoming larger as the reliability becomes higher,
    said apparatus further comprising;
    a determining section which is configured to determine whether a largest reliability value of the reliability values outputted by the reliability determining section is not more than a threshold value or not,
    wherein:
    in a case where the determining section determines that the largest reliability value is not more than the threshold value, the display control section causes the display device to display the preview image, and
    in a case where the determining section determines that the largest reliability value is larger than the threshold value, the display control section causes the display device not to display the preview image, and the rotation processing section carries out rotation processing with respect to the scanned image so that a direction corresponding to the largest reliability value coincides with the second reference direction.

7. The image processing apparatus according to claim 3, wherein:
    the reliability determining section outputs reliability values of the respective first through fourth directions, the reliability values being respective values indicating the reliability and becoming larger as the reliability becomes higher,
    said apparatus further comprising:
    a determining section configured to determine whether a difference parameter is not more than a threshold value or not, the difference parameter indicating a difference between a largest reliability value of and a second largest reliability value of the reliability values outputted by the reliability determining section,
    in a case where the determining section determines that the difference parameter is not more than the threshold value, the display control section causes the display device to display the preview image, and
    in a case where the determining section determines that the difference parameter is larger than the threshold value, the display control section causes the display device not to display the preview image, and the rotation processing section carries out rotation processing with respect to the scanned image so that a direction corresponding to the largest reliability value coincides with the second reference direction.

8. An image forming apparatus comprising an image processing apparatus recited in claim 1.

9. An image reading apparatus comprising an image processing apparatus recited in claim 1.

10. A method for controlling an image processing apparatus which is read out from a document and in which a document image is shown, comprising the steps of:

(a) determining from the scanned image reliability of coincidences of respective first through fourth directions with a first reference direction, the first through fourth directions being a direction pointing from a center of the document image toward respective four sides of the document image and being perpendicular to the respective four sides of the document image, the first reference direction being an upward direction of or a downward direction of the document image; and (b) creating markers indicating the respective first through fourth directions, and causing a display device to display a preview image in which the markers and the scanned image overlap each other, in the step (b), the markers being caused to be displayed in respective different ways in accordance with the reliability.

11. A computer-readable non-transitory storage medium for storing a control program for controlling an image processing apparatus recited in claim 1, and for causing a computer to function as each of the reliability determining section and the display control section.

* * * * *